United States Patent
Chen et al.

(10) Patent No.: US 10,966,194 B2
(45) Date of Patent: Mar. 30, 2021

(54) COORDINATED WIRELESS COMMUNICATIONS USING MULTIPLE TRANSMISSION TIME INTERVALS

(71) Applicant: QUALCOMM Incorporated, San Diego, CA (US)

(72) Inventors: Wanshi Chen, San Diego, CA (US); Shimman Arvind Patel, San Diego, CA (US); Peter Gaal, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 398 days.

(21) Appl. No.: 15/068,044

(22) Filed: Mar. 11, 2016

(65) Prior Publication Data

US 2016/0309466 A1 Oct. 20, 2016

Related U.S. Application Data

(60) Provisional application No. 62/147,947, filed on Apr. 15, 2015.

(51) Int. Cl.
*H04W 72/04* (2009.01)
*H04B 7/26* (2006.01)
(Continued)

(52) U.S. Cl.
CPC ...... *H04W 72/0446* (2013.01); *H04B 7/2628* (2013.01); *H04L 5/0023* (2013.01);
(Continued)

(58) Field of Classification Search
None
See application file for complete search history.

(56) References Cited

U.S. PATENT DOCUMENTS

| 8,644,292 B2 | 2/2014 | Gorokhov et al. |
| 2005/0073985 A1 | 4/2005 | Heo et al. |

(Continued)

FOREIGN PATENT DOCUMENTS

| CN | 102077627 A | 5/2011 |
| CN | 104254995 A | 12/2014 |

(Continued)

OTHER PUBLICATIONS

ISA/EPO, International Search Report and Written Opinion of the International Searching Authority, Int'l. App. No. PCT/US2016/023360, dated Jun. 7, 2016, European Patent Office, Rijswijk, NL, 12 pgs.

*Primary Examiner* — Mariela Vidal Carpio
(74) *Attorney, Agent, or Firm* — Holland & Hart LLP

(57) ABSTRACT

Coordinated wireless communications using multiple transmission time intervals (TTIs) are described. Multiple TTIs may include a first TTI and a second TTI, the second TTI having a shorter duration than the first TTI. One or more parameters may be determined for communications using the first TTI and the second TTI. A first parameter of the determined parameters for the second TTI may be associated or linked with a corresponding parameter of the first TTI, and communications using the first TTI or the second TTI may be performed using the first parameter. Wireless network nodes using the first TTI may form a CoMP cooperating set, and wireless network nodes using the second TTI may for another CoMP cooperating set, and the first parameter may be applied to each of the CoMP cooperating sets.

30 Claims, 16 Drawing Sheets

(51) Int. Cl.
  *H04L 5/00* (2006.01)
  *H04W 36/00* (2009.01)
  *H04W 72/12* (2009.01)

(52) U.S. Cl.
  CPC ....... *H04L 5/0035* (2013.01); *H04W 36/0069* (2018.08); *H04W 72/1278* (2013.01)

(56) References Cited

U.S. PATENT DOCUMENTS

| | | | | |
|---|---|---|---|---|
| 2008/0051149 | A1* | 2/2008 | Mehta | H04B 7/061 455/562.1 |
| 2008/0165879 | A1* | 7/2008 | Mehta | H04B 7/061 375/267 |
| 2009/0245212 | A1* | 10/2009 | Sambhwani | H04L 1/1671 370/336 |
| 2009/0262699 | A1* | 10/2009 | Wengerter | H04L 1/0072 370/330 |
| 2012/0028665 | A1 | 2/2012 | Kwon et al. | |
| 2012/0275355 | A1* | 11/2012 | Park | H04W 72/042 370/281 |
| 2013/0237212 | A1* | 9/2013 | Khayrallah | H04L 25/03949 455/423 |
| 2014/0071954 | A1* | 3/2014 | Au | H04W 72/0446 370/336 |
| 2014/0133395 | A1 | 5/2014 | Nam et al. | |
| 2014/0269520 | A1 | 9/2014 | Yi et al. | |
| 2014/0293815 | A1 | 10/2014 | Xia et al. | |
| 2015/0043542 | A1* | 2/2015 | Hoehne | H04W 72/0406 370/336 |
| 2015/0098438 | A1* | 4/2015 | Nammi | H04W 24/10 370/330 |
| 2015/0117352 | A1* | 4/2015 | Nammi | H04L 12/00 370/329 |
| 2017/0005764 | A1* | 1/2017 | Park | H04J 11/005 |
| 2017/0303182 | A1* | 10/2017 | Uchino | H04W 16/32 |
| 2017/0318565 | A1* | 11/2017 | Golitschek Edler von Elbwart | H04W 72/042 |
| 2018/0167896 | A1* | 6/2018 | Uchino | H04W 72/14 |
| 2018/0176934 | A1* | 6/2018 | Uchino | H04W 72/085 |
| 2020/0288472 | A1 | 9/2020 | Chen et al. | |

FOREIGN PATENT DOCUMENTS

| | | |
|---|---|---|
| CN | 104396176 A | 3/2015 |
| JP | 2014511080 A | 5/2014 |
| WO | WO-2007025160 A2 | 3/2007 |

* cited by examiner

COORDINATED WIRELESS COMMUNICATIONS USING MULTIPLE TRANSMISSION TIME INTERVALS

CROSS REFERENCES

The present application for patent claims priority to U.S. Provisional Patent Application No. 62/147,947, entitled "Coordinated Wireless Communications Using Multiple Transmission Time Intervals," filed Apr. 15, 2015, assigned to the assignee hereof.

BACKGROUND

The present disclosure, for example, relates to wireless communication systems, and more particularly to communications using several different transmission time intervals of various durations among two or more base stations.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology By way of example, a wireless multiple-access communications system may include a number of base stations, each simultaneously supporting communication for multiple communication devices, which may each be referred to as a user equipment (UE). A base station may communicate with the communication devices on downlink channels (e.g., for transmissions from a base station to a UE) and uplink channels (e.g., for transmissions from a UE to a base station).

Increasingly, many wireless applications benefit from reduced latency communication. Some wireless communications networks may employ communications having different (e.g., shorter) transmission time intervals (TTIs), which may reduce latency. However, coordination among multiple base stations using these different TTIs may present challenges.

SUMMARY

Systems, methods, and apparatuses for coordinated wireless communications using multiple transmission time intervals (TTIs) are described. The multiple TTIs may include a TTI shorter in duration than a traditional or legacy TTI duration, for example. Each TTI may be associated with different parameters (e.g., a channel state information (CSI) process, virtual cell identity (VCID), or physical downlink shared channel rate matching and quasi-co-location indicator (PQI) for each different TTI). A parameter for a first TTI may be associated with a corresponding, but different, parameter for a second TTI. In other examples, a parameter for a first TTI may the same as a corresponding parameter for a second TTI.

In some examples, wireless network nodes using the first TTI may form a coordinated multi-point (CoMP) cooperating set of nodes, and wireless network nodes using the second TTI may for another CoMP cooperating set of nodes. A CoMP transmission scheme using the second TTI may be determined based on a timing of a second TTI transmission relative to the first TTI. For example, a CoMP transmission scheme may be disabled if a transmission using the second TTI coincides with a control region of the first TTI, and the CoMP transmission scheme may be enabled if the transmission using the second TTI coincides with a data region of the first TTI. Such a CoMP transmission scheme may be based on a CRS if the transmission using the second TTI coincides with the control region of the first TTI, and may be based on a DM-RS if the transmission using the second TTI coincides with the data region of the first TTI.

A method of wireless communication is described. The method may include determining a first set of parameters for communications using a first TTI, determining a second set of parameters for communications using a second TTI, wherein the second TTI has a shorter duration than the first TTI, associating a first parameter in the second set of parameters with a corresponding parameter in the first set of parameters, and performing communications using at least one of the first TTI or the second TTI and the first parameter.

An apparatus for wireless communication is described. The apparatus may include means for determining a first set of parameters for communications using a first TTI, means for determining a second set of parameters for communications using a second TTI, wherein the second TTI has a shorter duration than the first TTI, means for associating a first parameter in the second set of parameters with a corresponding parameter in the first set of parameters, and means for performing communications using at least one of the first TTI or the second TTI and the first parameter.

Another apparatus for wireless communication is described. The apparatus may include a processor, memory in electronic communication with the processor, and instructions stored in the memory. The instructions may be executable by the processor to determine a first set of parameters for communications using a first TTI, determine a second set of parameters for communications using a second TTI, wherein the second TTI has a shorter duration than the first TTI, associate a first parameter in the second set of parameters with a corresponding parameter in the first set of parameters, and perform communications using at least one of the first TTI or the second TTI and the first parameter.

A non-transitory computer-readable medium storing code for wireless communication is described. The code may include instructions executable to determine a first set of parameters for communications using a first TTI, determine a second set of parameters for communications using a second TTI, wherein the second TTI has a shorter duration than the first TTI, associate a first parameter in the second set of parameters with a corresponding parameter in the first set of parameters, and perform communications using at least one of the first TTI or the second TTI and the first parameter.

In some examples of the method, apparatuses, or non-transitory computer readable medium, the first parameter may include at least one of a time tracking parameter of a node, or a frequency tracking parameter of the node, or both.

Some examples of the method, apparatuses, or non-transitory computer-readable medium may include steps, means, features, or instructions for performing communications with a first cell using the first TTI, and performing communications with a second cell using the second TTI, wherein the second cell is different than the first cell.

In some examples of the method, apparatuses, or non-transitory computer readable medium, performing communications may include steps, means, features, or instructions for performing CoMP communications with a node. In some examples the CoMP communications may include at least one of dynamic point selection (DPS) CoMP communications, coordinated beamforming (CBF) CoMP communications, or joint transmission (JT) CoMP communications for the node, or any combination thereof.

In some examples of the method, apparatuses, or non-transitory computer-readable medium, performing communications may include identifying a first plurality of nodes in a first CoMP cooperating set of nodes and a second plurality of nodes in a second CoMP cooperating set of nodes, and the first CoMP cooperating set of nodes may communicate using the first TTI and the second CoMP cooperating set of nodes may communicate using the second TTI, and performing communications with a UE using one or more of the first CoMP cooperating set of nodes or the second CoMP cooperating set of nodes. In some examples the second plurality of nodes in the second CoMP cooperating set of nodes may be a subset of the first plurality of nodes in the first CoMP cooperating set of nodes.

In some examples of the method, apparatuses, or non-transitory computer readable medium, performing communications may include performing common reference signal (CRS) based communications or demodulation reference signal (DM-RS) based communications, and the first parameter may include a CRS-based parameter or a DM-RS-based parameter.

In some examples of the method, apparatuses, or non-transitory computer-readable medium, the first parameter may include a parameter for a channel state information (CSI) process for the second TTI. Some examples may further include steps, means, features, or instructions for identifying two or more CSI processes for communications using the first TTI or the second TTI. In some examples the two or more CSI processes may be triggered in a periodic manner or in an aperiodic manner. In some examples the parameter for the CSI process for the second TTI may be associated with a corresponding CSI process for communications using the first TTI. In some examples an association between the CSI processes may be predefined or signaled to a UE through radio resource control (RRC) signaling. In some examples the parameter for the CSI process for the second TTI may include at least one of a rank indicator (RI), a precoding matrix indictor (PMI), or a precoding type indicator (PTI), or any combination thereof. In some examples the RI, PMI, or PTI of the parameter for the CSI process for the second TTI may be preconfigured to be the same as the corresponding parameter used for communications using the first TTI, and a UE may be signaled to disassociate the RI, PMI, or PTI through radio resource control (RRC) signaling. In some examples the parameter for the CSI process for the second TTI may include a channel quality indicator (CQI) that is derived from a CQI for communications using the first TTI. In some examples a number of CSI processes for communications using the second TTI may be less than or equal to a number of CSI processes for communications using the first TTI.

In some examples of the method, apparatuses, or non-transitory computer-readable medium, the first parameter may include a virtual cell identity (VCID) for the second TTI. A VCID configuration for communications using the second TTI may be the same as, or different from a VCID configuration as for communications using the first TTI. In some examples the VCID configuration for communications using the second TTI may be associated with the VCID configuration for communications using the first TTI. In some examples, a number of VCIDs configured for communications using the second TTI may be less than or equal to a number of VCIDs configured for communications using the first TTI. In some examples, for a data communication, the VCID using the second TTI or the first TTI may be determined by signaling in a control channel. In some examples, a control channel communication for a first VCID may be determined for a first decoding candidate, and a control channel communication for a second VCID may be determined for a second decoding candidate.

In some examples of the method, apparatuses, or non-transitory computer-readable medium, the first parameter may include at least one of physical downlink shared channel rate matching, or a quasi-co-location indicator (PQI) configuration for the second TTI, or any combination thereof. In some examples the PQI configuration for communications using the second TTI may be a same PQI configuration as for communications using the first TTI. In some examples the PQI configuration for communications using the second TTI may be different from a PQI configuration for communications using the first TTI. In some examples the VCID configuration for communications using the second TTI may be associated with the VCID configuration for communications using the first TTI. In some examples, a number of PQI configurations for communications using the second TTI may be less than or equal to a number of PQI configurations for communications using the first TTI. In some examples, for a data communication, the PQI configuration using the second TTI or the first TTI may be determined by a signaling in a control channel. In some examples, for a control channel communication, a first PQI configuration may be determined for a first decoding candidate, and a second PQI configuration may be determined for a second decoding candidate.

Some examples of the method, apparatuses, or non-transitory computer-readable medium may include steps, means, features, or instructions for determining a CoMP transmission scheme of a transmission using the second TTI based at least in part on a timing of the transmission using the second TTI relative to the first TTI. In some examples, the CoMP transmission scheme may be disabled when the transmission using the second TTI coincides with a control region according to the first TTI and the CoMP transmission scheme may be enabled when the transmission using the second TTI coincides with a data region according to the first TTI. In some examples, the CoMP transmission scheme is based on a common reference signal (CRS) when the transmission using the second TTI coincides with a control region according to the first TTI and the CoMP transmission scheme is based on a demodulation reference signal (DM-RS) when the transmission using the second TTI coincides with a data region according to the first TTI.

In some examples, a quantity of orthogonal frequency division multiplexing (OFDM) symbols in a control region according to the first TTI may be variable, and one or more OFDM symbols may be blindly decoded to determine if the OFDM symbols comprise control region OFDM symbols or data region OFDM symbols. In some examples, a number of orthogonal frequency division multiplexing (OFDM) symbols of a control region according to the first TTI is determined based at least in part on a channel format indicator and a type of subframe transmitted using the second TTI. In some examples, a subset of orthogonal frequency division multiplexing (OFDM) symbols transmitted using the first TTI may be configured to be control region symbols according to the first TTI irrespective of whether each symbol in the subset of OFDM symbols includes control information or data. In some examples the CoMP transmission scheme for a control region in the first TTI and a number of orthogonal frequency division multiplexing (OFDM) symbols of the control region may be signaled to a user equipment (UE).

A method of wireless communication is described. The method may include identifying a first TTI for communications, identifying a second TTI for communications, wherein the second TTI has a shorter duration than the first TTI, and determining a CoMP transmission scheme of a transmission using the second TTI based on a timing of the transmission using the second TTI relative to the first TTI.

An apparatus for wireless communication is described. The apparatus may include means for identifying a first TTI for communications, means for identifying a second TTI for communications, wherein the second TTI has a shorter duration than the first TTI, and means for determining a CoMP transmission scheme of a transmission using the second TTI based on a timing of the transmission using the second TTI relative to the first TTI.

Another apparatus for wireless communication is described. The apparatus may include a processor, memory in electronic communication with the processor, and instructions stored in the memory. The instructions may be executable by the processor to identify a first TTI for communications, identify a second TTI for communications, wherein the second TTI has a shorter duration than the first TTI, and determine a CoMP transmission scheme of a transmission using the second TTI based on a timing of the transmission using the second TTI relative to the first TTI.

A non-transitory computer-readable medium storing code for wireless communication is described. The code may include instructions executable to identify a first TTI for communications, identify a second TTI for communications, wherein the second TTI has a shorter duration than the first TTI, and determine a CoMP transmission scheme of a transmission using the second TTI based on a timing of the transmission using the second TTI relative to the first TTI.

In some examples of the method, apparatuses, or non-transitory computer-readable medium, the CoMP transmission scheme may be disabled when the transmission using the second TTI coincides with a control region according to the first TTI and the CoMP transmission scheme may be enabled when the transmission using the second TTI coincides with a data region according to the first TTI.

In some examples of the method, apparatuses, or non-transitory computer-readable medium, the CoMP transmission scheme may be based on a common reference signal (CRS) when the transmission using the second TTI coincides with a control region according to the first TTI and the CoMP transmission scheme may be based on a demodulation reference signal (DM-RS) when the transmission using the second TTI coincides with a data region according to the first TTI.

In some examples of the method, apparatuses, or non-transitory computer-readable medium, a quantity of OFDM symbols in a control region according to the first TTI may be variable, and one or more OFDM symbols may be blindly decoded to determine if the OFDM symbols comprise control region OFDM symbols or data region OFDM symbols.

In some examples of the method, apparatuses, or non-transitory computer-readable medium, a number of OFDM symbols of a control region according to the first TTI may be determined based at least in part on a channel format indicator and a type of subframe transmitted using the second TTI.

In some examples of the method, apparatuses, or non-transitory computer-readable medium, a subset of OFDM symbols transmitted using the first TTI may be configured to be control region symbols according to the first TTI irrespective of whether each symbol in the subset includes control information or data.

In some examples of the method, apparatuses, or non-transitory computer-readable medium, the CoMP transmission scheme for a control region according to the first TTI and a number of OFDM symbols of the control region may be signaled to a UE.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
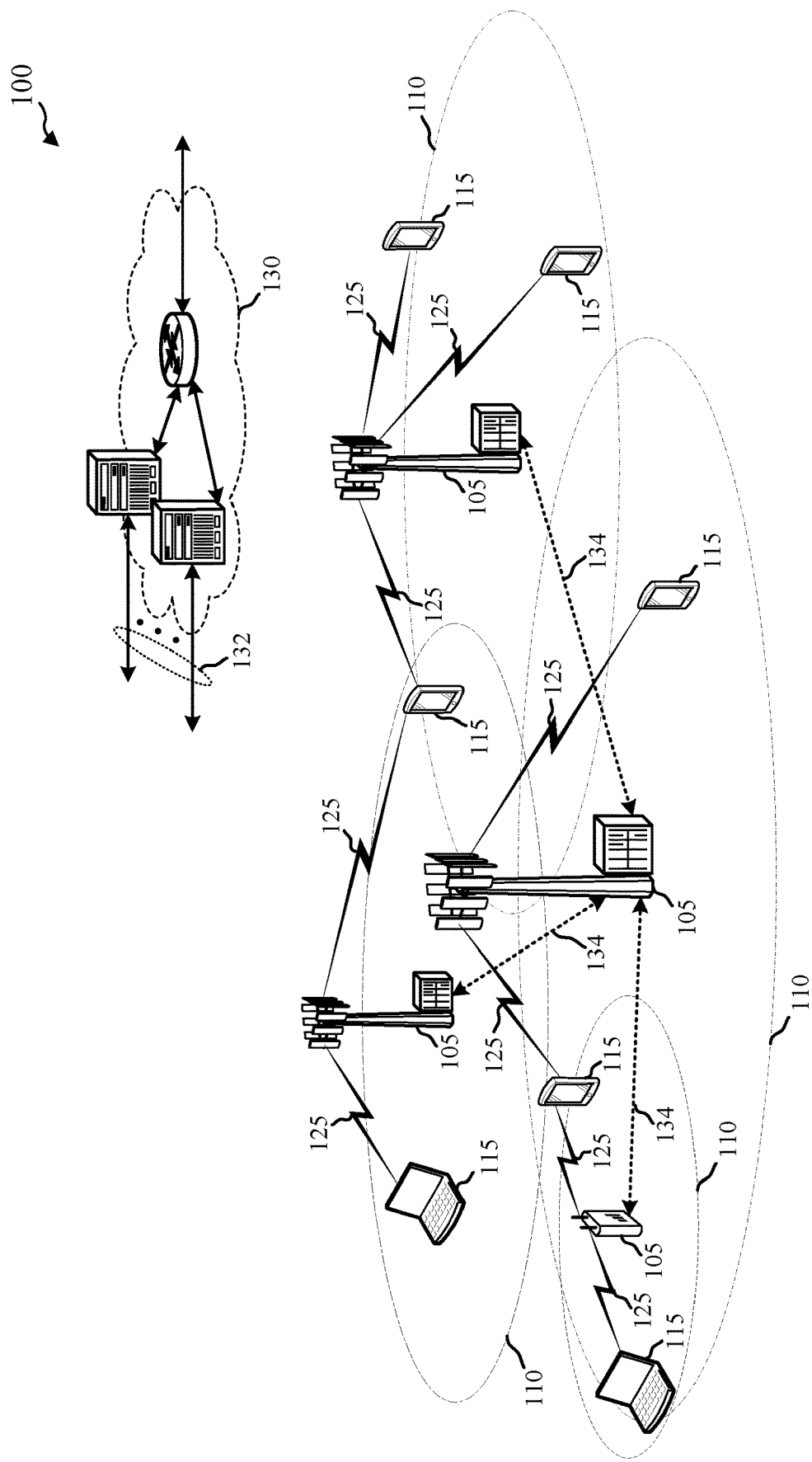
FIG. 1 illustrates an example of a wireless communications system that supports communication using multiple TTI durations in accordance with various aspects of the present disclosure.

In some deployments of a wireless communications network, multiple transmission time interval (TTI) structures may be supported, and some communications may be performed using a first TTI that is a traditional or legacy duration (e.g., a 1 millisecond duration), and some communications may be performed using a second TTI that is shorter in duration than the first TTI (e.g., a symbol level TTI). Such deployments may provide for a reduction in latency for some communications, which may be referred to as -low latency communications. The present disclosure describes various tools and techniques for enhancing communications through coordination of wireless communications using multiple TTIs.

In some aspects of the present disclosure, coordination of transmissions may be performed in which the transmissions use multiple TTIs, such as a first TTI and a second TTI, and in which the second TTI may have a shorter duration than the first TTI. Parameters of a first set of parameters may be determined for communications using the first TTI, and parameters of a second set of parameters may be determined for communications using the second TTI. A first parameter in the second set of parameters may be associated or linked with a corresponding parameter in the first set of parameters, and communications using the first TTI or the second TTI may be performed using the first parameter. Such parameters may include, for example, at least one of a time tracking parameter, or a frequency tracking parameter, or both, such that a parameter of the second set of parameters is associated with a corresponding parameter (e.g., time, frequency, etc.) of the first set of parameters.

In some deployments, wireless communications networks may employ coordinated multi-point (CoMP) transmissions in which two or more wireless network nodes (e.g., base stations, access points, UEs, etc.) may transmit data to a UE. Such CoMP transmissions may use one or more of several CoMP schemes, including dynamic point selection (DPS) in which different nodes transmit data to a UE at different times, joint transmission (JT) in which two or more nodes contemporaneously transmit data to a UE, and coordinated beamforming (CBF) in which two or more nodes coordinate signal transmissions that reduce interference between the two or more nodes (e.g., interference between base stations, nodes in adjacent cells, etc.).

In some examples, wireless network nodes using the first TTI may form a first CoMP cooperating set of nodes, and wireless network nodes using the second TTI may for a second CoMP cooperating set of nodes. The first parameter, in some examples, may be applied to each of the CoMP cooperating sets of nodes. The first parameter may include, for example, a common reference signal (CRS) based parameter, a demodulation reference signal (DM-RS) based parameter, a parameter for a channel state information (CSI) process, a virtual cell identity (VCID), or a physical downlink shared channel rate matching and quasi-co-location indicator (PQI) configuration.

In some examples, a CoMP scheme of a transmission using the second TTI may be determined based on a timing of a second TTI transmission relative to the first TTI. For example, a CoMP transmission scheme may be disabled if a transmission using the second TTI coincides with (e.g., overlaps, occurs during, or is located in) a control region of the first TTI, and the CoMP transmission scheme may be enabled if the transmission using the second TTI coincides with (e.g., overlaps, occurs during, or is located in) a data region of the first TTI. Such a CoMP transmission scheme may be based on a CRS if the transmission using the second TTI coincides with the control region of the first TTI, and may be based on a DM-RS if the transmission using the second TTI coincides with the data region of the first TTI.

As mentioned, wireless systems according to various aspects of the present disclosure may employ a dual TTI structure, in which transmissions using one of the TTI structures, such as a low latency TTI, may be transparent to receiving devices that do not support operations using low-latency protocol, such that some devices may operate in the system without recognizing that certain transmissions have a different TTI. In some deployments, the numerology of low latency transmissions may be consistent with numerology for non-low latency system operation; UEs capable of low latency operations can utilize the low latency symbols while UEs incapable of low latency operations, or otherwise not configured for low latency operations, can readily ignore the symbols. As described herein, a system may leverage LTE numerology (e.g., timing, TTI structure, etc.) to minimize implementation effort and foster backwards compatibility. For instance, certain systems supporting low latency may include a 15 kHz tone spacing and provide a symbol duration of about 71 μs for a normal cyclic prefix (CP), and a symbol duration of about 83 μs for an extended CP. This approach may thus provide for integration of both UEs capable of low latency operations and UEs incapable of low latency operations or legacy UEs (e.g., UEs operating according to earlier versions of an LTE standard).

As mentioned above, and as further described herein, a low latency TTI structure may reduce latency in a wireless system. For example, as compared to an LTE system without a low latency TTI structure, latency may be reduced from approximately 4 ms to approximately 300 μs. This represents more than an order of magnitude reduction in latency. Because a TTI for each low latency period may be a single symbol period, a potential latency reduction of 12× or 14× (for extended CP and normal CP, respectively) may be realized.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with reference to some examples may be combined in other examples.

FIG. 1 illustrates an example of a wireless communications system 100 that supports communication using multiple TTI durations in accordance with various aspects of the present disclosure. The wireless communications system 100 includes base stations 105, multiple pieces of user equipment (UE) 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X2, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies.

In some examples, the wireless communications system 100 is a Long Term Evolution (LTE)/LTE-Advanced (LTE-A) network. In LTE/LTE-A networks, the term evolved node B (eNB) may be generally used to describe the base stations 105. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on internet protocol (IP). A radio link control (RLC) layer may perform packet segmentation and reassembly to communicate over logical channels. A medium access control (MAC) layer may perform priority handling and multiplexing of logical channels into transport channels. The transport channels may be in transport blocks at the bottom of the MAC. The MAC layer may also use hybrid automatic repeat request (HARM) procedures to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels. For example, a MAC layer transport block may be mapped to a subframe at the PHY layer.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some examples of the wireless communications system 100, the UEs 115 may be configured to collaboratively communicate with multiple base stations 105 through, for example, Multiple Input Multiple Output (MIMO), Coordinated Multi-Point (CoMP), or other schemes. MIMO techniques may use multiple antennas on the base stations and/or multiple antennas on the UE to take advantage of multipath environments to transmit multiple data streams. CoMP, as mentioned above, may include techniques for coordination of transmission and reception by one or more base stations 105 to improve overall transmission quality for UEs 115 as well as increasing network and spectrum utilization. CoMP techniques may utilize backhaul links 132 and/or 134 for communication between base stations 105 to coordinate control plane and user plane communications for the UEs 115. A coordination area for CoMP may include, for example, homogeneous deployments that utilize intra-eNB CoMP or inter-eNB CoMP. In various examples described herein, base stations 105, which may be eNBs, or cells thereof in a CoMP coordination area may be referred to as a CoMP cooperating set. In some examples, UEs 115 may communicate directly with one another (e.g., in a device-to-device or "D2D" deployment), in which case one or more UEs 115 may be nodes of a CoMP cooperating set.

Various deployments may provide for communications using multiple TTIs, in which communications using the different TTIs may use CoMP transmission techniques. Such CoMP communications may use one or more of several CoMP transmission schemes, including DPS, JT, or CBF CoMP transmission schemes. According to various aspects, one or more parameters for a first CoMP cooperating set may be determined for communications using a first TTI, which may be associated with one or more corresponding parameters for a second CoMP cooperating set that may use a second TTI (e.g., a second TTI that has a shorter duration than the first TTI). Such parameter(s) may include, for example, at least one of a time tracking parameter, a frequency tracking parameter, or both, such that parameter, such as time or frequency tracking parameters, of the second CoMP cooperating set may be associated with the corresponding parameters of the first CoMP cooperating set, as will be described in more detail below.

Wireless communications system 100 may support operation on multiple cells or carriers, a feature which may be referred to as carrier aggregation (CA) or multi-carrier operation. A carrier may also be referred to as a component carrier (CC), a layer, or the like. The terms "carrier," "component carrier," and "cell" may be used interchangeably herein. A UE 115 may be configured with multiple downlink CCs and one or more uplink CCs for carrier aggregation. Carrier aggregation may be used with both FDD and TDD component carriers. In some cases, wireless communications system 100 may utilize enhanced CCs (eCC). An eCC may be characterized by features, including: flexible bandwidth, variable length TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is licensed to use the spectrum). An eCC characterized by flexible bandwidth may include one or more segments that may be utilized by UEs 115 that do are not capable of monitoring the whole bandwidth or prefer to use a limited bandwidth (e.g., to conserve power).

Some aspects of the disclosure may provide a wireless communications system 100 that may support a dual TTI structure (e.g., at the subframe level and symbol-level). Low latency resources may be configured to provide various different physical channels, including uplink and downlink shared channels, uplink and downlink control channels, and random access channels. Various aspects of the disclosure provide for coordination with communications having multiple different TTIs, and procedures that may provide for efficient access and use of the wireless communications system 100 with multiple different TTIs.

Figure 2:
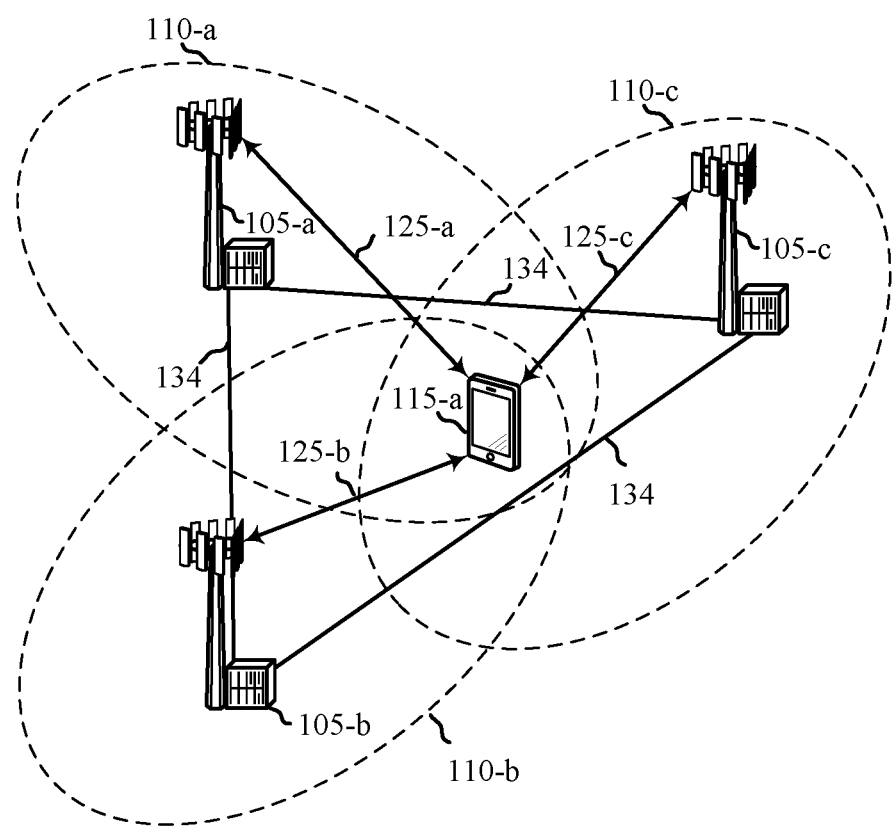
FIG. 2 illustrates an example of a wireless communications system that supports coordinated communications using multiple TTI durations in accordance with various aspects of the present disclosure.

FIG. 2 illustrates an example of a wireless communications system 200 that supports coordinated communications using multiple TTI durations in accordance with various aspects of the present disclosure. Wireless communications system 200 may include a UE 115-a, which may be an example of a UE 115 described with reference to FIG. 1. Wireless communications system 200 may also include multiple base stations 105, including a first base station 105-a, a second base station 105-b, and a third base station 105-c, each of which may be an example of a base station 105 described with reference to FIG. 1. Base stations 105 may transmit control and data to UEs 115 within its geographic coverage area 110. In this example, base stations 105-a, 105-b, and 105-c may have overlapping geographic coverage areas 110-a, 110-b, and 110-c, respectively. First base station 105-a may communicate with UE 115-a through communication link 125-a, second base station 105-b may communicate with UE 115-a through communication link 125-b, and third base station 105-c may communicate with UE 115-a through communication link 125-c. Further, each base station 105 may communicate with other base stations 105 via backhaul links 134.

In various aspects of the disclosure, base stations 105 (e.g., base station 105-a, base station 105-b and base station 105-c) may form one or more CoMP cooperating sets, and may support CoMP communications with the UE 115-*a*. For example, one or more of the base stations 105 may provide capability for transmissions using a shorter duration (e.g., low latency) TTI, and one or more of the base stations 105 may provide capability for transmissions using a longer duration TTI (e.g., a 1 ms TTI), which may be referred to as a non-low-latency or legacy TTI. In some examples, each of the base stations 105 may be capable of supporting communications using multiple TTIs, or a subset of the base stations 105 may be capable of supporting communications using one TTI. In some examples, a first CoMP cooperating set may include two or more of the base stations 105 (e.g., first base station 105-*a* and second base station 105-*b*) and may provide CoMP communications using a longer duration TTI, and a second CoMP cooperating set may include two or more of the base stations (e.g., second base station 105-*b* and third base station 105-*c*) and may provide CoMP communications using a shorter duration TTI.

In various examples, the CoMP transmissions performed by the base stations 105 may include one or more CoMP transmission schemes and control techniques that have been established for LTE/LTE-A. For example, base stations 105 in a CoMP cooperating set may employ cross-cell control for dynamic point selection (DPS), in which control information may be provided by first base station 105-*a*, for example, and data may be provided by the second base station 105-*b* and/or the third base station 105-*c*. In such cases, dynamic rate-matching may be signaled through a control channel established between first base station 105-*a* and UE 115-*a*. In another example, one or more base stations 105 of a CoMP cooperating set may provide quasi-collocated linkage among different reference signals from different base stations 105, such as a demodulation reference signal (DM-RS), channel state information reference signal (CSI-RS), and common reference signal (CRS). Such reference signals may provide timing, frequency tracking, or channel estimation information for base stations 105 of a CoMP coordinated set.

According to various aspects of the present disclosure, multiple CoMP cooperating sets may be provided that each may provide communications using a different TTI, and in which a parameter of one TTI may be associated with a parameter of another TTI. In some examples, the UE 115-*a* may measure various parameters from one or more of the reference signals from each base station 105, and report the measurements, for example, to first base station 105-*a*. In some examples, UE 115-*a* may be configured for sets of virtual cell IDs (VCIDs) for one or more reference signals for communications using one TTI, such as the CSI-RS or DM-RS, for example. In some examples, UE 115-*a* may be provided common CRS locations, CSI-RS configurations, and physical downlink shared channel (PDSCH) starting symbols, for example, for communications using the TTI. In some examples, a VCID for communications using one TTI may be associated with a VCID for communications using another TTI, as will be discussed in more detail below. In other examples, one or more of base stations 105-*b* or 105-*c* may inherit a rank indicator (RI) from base station 105-*a* for use with multiple CSI processes for a particular TTI.

In some deployments, CSI feedback may be provided through, for example, multiple CSI processes and interference measurement resource (IMR) based interference measurement may be provided. Furthermore, demodulation for transmissions from base stations 105 of a CoMP cooperating set may be enhanced through, for example, VCIDs, rate matching, or collocation, or combinations thereof. CSI feedback for CoMP communications may be provided through one or more CSI processes, as mentioned, in which each CSI process may define a channel or interference hypothesis for CSI feedback, in which a CSI process may be associated with a non-zero power (NZP) CSI-RS for channel measurement, or associated with one or more IMR for interference measurement. In some deployments, up to four CSI processes may be configured, in which each CSI process may be associated with particular subframe sets, for example. As mentioned, a CSI process may be associated with a NZP CSI-RS, which may be used for channel measurement. In some deployments, up to three NZP CSI-RS resources may be configured. Some CSI processes may be associated, as mentioned, with an IMR, which may be one or more resource elements (REs) on which an interference measurement may be taken. In some deployments, up to three IMRs may be configured. Thus, a combination of one or more NZP CSI-RSs and one or more IMRs may be combined to provide up to four CSI processes for a CoMP cooperating set. Additionally, one or more zero-power (ZP) CSI-RS resources may be provided, which may be used to define rate matching behavior of the UE 115-*a* to provide rate matching around IMRs and allow the network to generate appropriate interference conditions on the IMR REs. Further, rate matching around NZP CSI-RS allows the network to boost the signal to interference plus noise ratio (SINR) conditions on the CSI-RS REs to boost channel measurement accuracy. In some deployments, up to 4 different ZP CSI-RS configurations may be supported (e.g., one per rate matching set).

As mentioned above, various CoMP transmission schemes may provide enhanced demodulation, such as DPS transmission schemes. Such DPS schemes may provide for configuration of virtual cell ID (VCID) for use by UE 115-*a*, rather than a physical cell identifier (PCI), and that may be used for DM-RS sequence initialization. In some deployments, up to two VCIDs, which may be dynamically switched (e.g., indicated in downlink control information (DCI)). DPS schemes may provide for support of quasi-co-location (QCL) behavior, and may provide information on assumptions that may be made in terms of time and/or frequency tracking. A network may deviate from strict collocation for actual physical transmissions, so long as no significant performance degradation occurs, due to the UE 115-*a* adopting the signaled assumptions. DPS may also provide support for dynamic rate matching between transmissions from different base stations 105.

Different QCL behaviors may be provided, which may depend on whether reference signal types are the same or different. In some deployments, QCL behavior within a same reference signal type may depend upon a type of reference signal. For a NZP CSI-RS resource, in some aspects ports may be assumed as quasi co-located with respect to delay spread, receive power, frequency shift, Doppler spread, and received timing. For CRS resources, a CRS may be assumed as quasi co-located with respect to one or more long term channel properties, such as delay spread, receive power, frequency shift, Doppler spread, or Received timing. For PDSCH DM-RS resources, a demodulation reference signal (DMRS) may be assumed as quasi co-located within a subframe with respect to, for example, delay spread, receive power, frequency shift, Doppler spread, or receive timing.

In some examples, QCL behavior of wireless network nodes across reference signal types may be provided. For example, for PDSCH DM-RS versus CSI-RS or CRS reference signal types, a legacy behavior may be provided in which CRS, CSI-RS and PDSCH DMRS may be assumed as quasi co-located at least with respect to frequency shift, Doppler spread, received timing, and delay spread. In other examples, a CoMP behavior may be provided in which CRS, CSI-RS, and PDSCH DM-RS are not assumed as quasi co-located with the exception that a PDSCH DMRS and a particular CSI-RS resource may be indicated by physical layer signaling to be assumed as quasi co-located with respect to, for example, delay spread, Doppler spread, Doppler shift, or average delay. In some examples, for each CSI-RS resource, the network may indicate by RRC signaling that CSI-RS ports and CRS ports of a cell may be assumed as quasi co-located with respect to Doppler shift or Doppler spread. In other examples, for primary synchronization signal (PSS), secondary synchronization signal (SSS), or CRS reference signal types, ports for a serving cell may be assumed as quasi co-located with respect to, for example, frequency shift or received timing.

As mentioned above, in some examples CRS, CSI-RS, and PDSCH DMRS are not assumed as quasi-co-located with the exception that PDSCH DMRS and a particular CSI-RS resource (e.g., as indicated by physical layer signaling) may be assumed as quasi co-located with respect to, for example, delay spread, Doppler spread, Doppler shift or average delay. Such an assumption may facilitate time tracking based on a signaled NZP CSI-RS resource. In some examples, for each CSI-RS resource, the network may indicate by RRC signaling that CSI-RS ports and CRS ports of a cell may be assumed as quasi co-located with respect to Doppler shift and Doppler spread, which may facilitate frequency tracking that may not be possible with CSI-RS.

In certain aspects, for DPS CoMP transmission schemes, different wireless network nodes (e.g., first base station 105-*a* and second base station 105-*b*) may have different CRS location, ZP CSI-RS configuration, and PDSCH starting symbols. To facilitate dynamic switching between such different cells with different rate matching behavior, the UE 115-*a* may be informed of, for example, a number of CRS ports and CRS frequency shift, a ZP CSI-RS configuration, and a PDSCH starting symbol. In some deployments, a total of four states may be RRC-configured for dynamic indication of rate matching and QCL, with such states referred to as "PQI" states, and in each of the states, information from the below Table 1 may be included.

Figure 3:
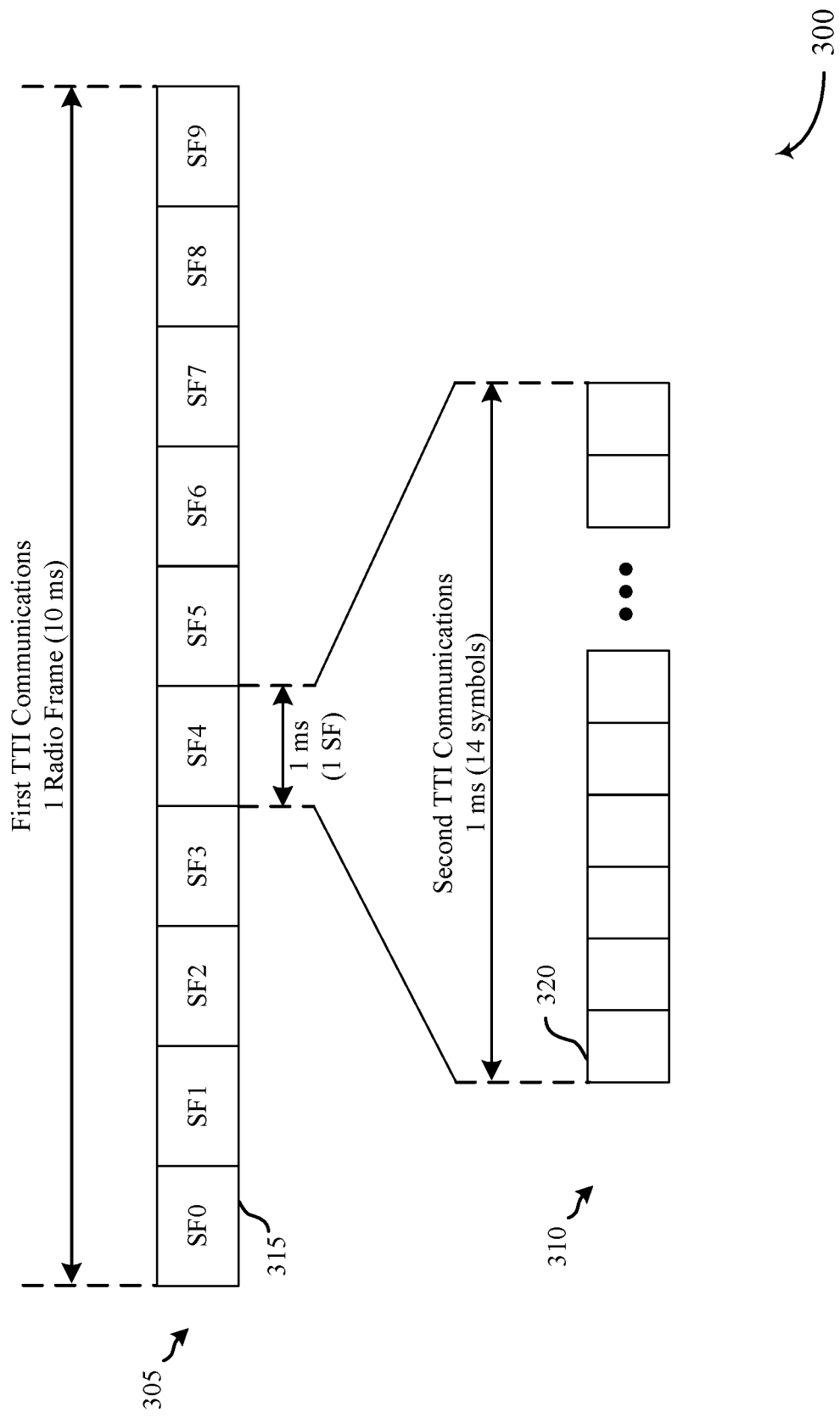
FIG. 3 illustrates an example of communications having different TTI durations in accordance with various aspects of the present disclosure.

As discussed, in various examples a wireless communications system, such as system 100 or 200 of FIG. 1 or 2, may utilize a dual TTI structure (e.g., at the subframe level and symbol-level). FIG. 3 illustrates an example 300 of communications (e.g., subframe-level communications 305 and symbol-level communications 310) having different TTI durations in accordance with various aspects of the present disclosure. According to various aspects of the disclosure, wireless network nodes (e.g., base stations 105 or UEs 115 as described with reference to FIG. 1 or 2) may communicate using one or both of subframe-level communications 305 or low latency communications 310. Subframe-level communications 305 may use a number of subframes 315 that make up a radio frame, such as 10 subframes 315 that may make up a legacy LTE radio frame. Each subframe may be a 1 ms subframe, which may define a TTI for the subframe-level communications 305. low latency communications 310 may include a number of symbols 320, which may be referred to as low latency symbols, and which may define a TTI for the low latency communications 310.

Low latency communications 310 may be transparent to certain receiving devices, such as a legacy UE that does not support low latency communications, such that some devices may operate in the system that supports both subframe-level communications 305 and low latency symbol-level communications 310. In some deployments, the numerology of low latency symbols 320 may be consistent with numerology for a subframe 315, and in the example of FIG. 3, 14 symbols 320 may correspond to a 1 ms subframe 315 duration. In such a manner, UEs 115 that support low latency communications can utilize symbols 320 of the low latency communications 310 while UEs 115 that do not support low latency communications, or UEs 115 that are operating in a legacy mode, can readily ignore the symbols 320. A system may leverage LTE numerology (e.g., timing, TTI structure, etc.) to minimize implementation effort and foster backwards compatibility. For instance, in certain systems supporting low latency communications 310 may include a 15 kHz tone spacing and a normal CP to provide a symbol 320 duration of 71 μs. Such a TTI structure may significantly reduce latency in a wireless system relative to latency for subframe-level communications 305. For

TABLE 1

| Parameter | Description | Purpose |
|---|---|---|
| CRS frequency shift | Inform UE of CRS RE locations | Inform UE of PDSCH rate matching assumptions |
| Number of CRS ports | 1, 2, or 4 CRS ports | |
| MBSFN configuration | Same as in non-CoMP case. | |
| PDSCH starting symbol | Either of the following: N ∈ {1, 2, 3, 4} PCFICH of serving cell (non X-carrier scheduling) or higher-layer conf. value (X-carrier scheduling) | |
| ZP CSI-RS configuration | Each ZP-CSI-RS configuration as in Rel-10 | |
| CSI-RS resource index | Index to 1 of 3 NZP CSI-RS resources | Quasi-co-location signaling |

In various deployments a PDSCH RE mapping and QCL indicator (PQI) field may be signaled to support CoMP transmissions. In some examples, a PQI field may be provided in DCI transmissions from a base station 105. Such PQI DCI information may be provided, for example, in a two-bit field that may provide a dynamic signaling of rate matching and QCL, in which the four states may be configured by the network and dynamically signaled through such PQI signaling.

example, subframe-level communications 305 may have a latency of approximately 4 ms between transmission of a subframe 315 and acknowledgment of receipt of the subframe 315, and low latency communications 310 may have a latency of approximately 300 μs between transmission of a symbol 320 and acknowledgment of receipt of the symbol 320. This represents more than an order of magnitude reduction in latency. Because a TTI for each low latency period may be a single symbol 320 period, a potential latency reduction of 12× or 14× (for extended CP and normal CP, respectively) may be realized.

According to some examples, two or more base stations (e.g., two or more base stations 105 of FIG. 1 or 2) may be included in a first CoMP cooperating set that may support communications using subframe-level communications 305, and two or more (same or different) base stations (e.g., two or more base stations 105 of FIG. 1 or 2) may be included in a second CoMP cooperating set that may support communications using low latency communications 310. In order to facilitate CoMP transmission schemes between base stations communicating using the different TTIs, one or more parameters of one TTI may be associated with a corresponding parameter of the other TTI. For example, one or more of the parameters associated with CoMP communications as discussed above with reference to FIG. 2 may be associated between the two different TTIs, as will be discussed in more detail below.

As mentioned above, in certain examples, wireless network nodes (e.g., base stations 105 or UEs 115 described with reference to FIG. 1 or 2) may use different TTIs for communications, and may link one or more parameters associated with one TTI to one or more corresponding parameters for communications using another TTI. In some examples, multiple base stations 105 that communicate using different TTIs may be included in different CoMP cooperating sets. Thus, the base stations 105 that may be included in a first CoMP cooperating set for communications using a first TTI may be different than base stations 105 in a second CoMP cooperating set for communications using a second TTI (e.g., a second TTI that has a shorter duration than the first TTI).

Figure 4B:
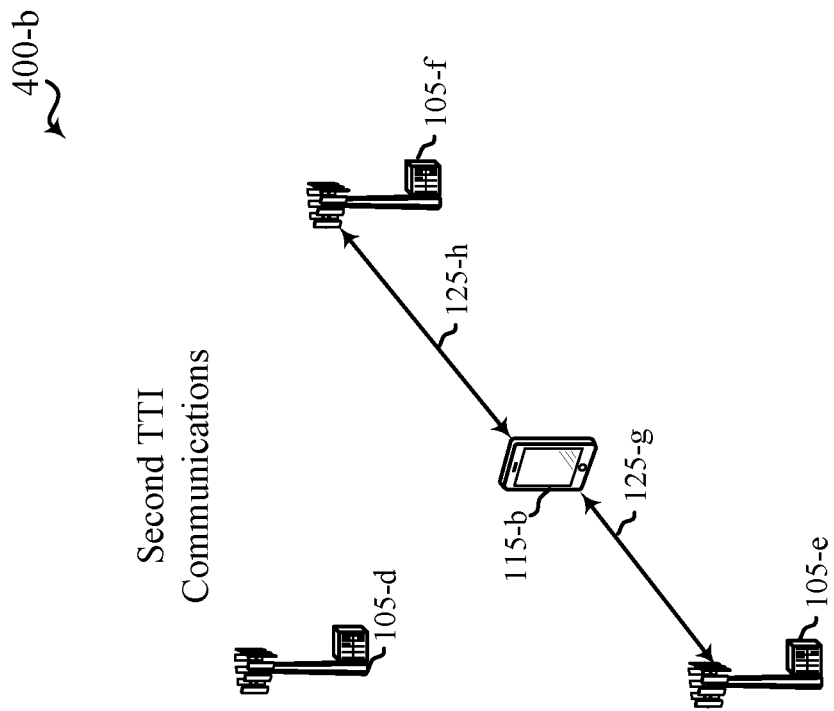
FIG. 4B illustrates an example of a wireless communications system that supports CoMP communications having a second TTI duration in accordance with various aspects of the present disclosure.
Figure 4A:
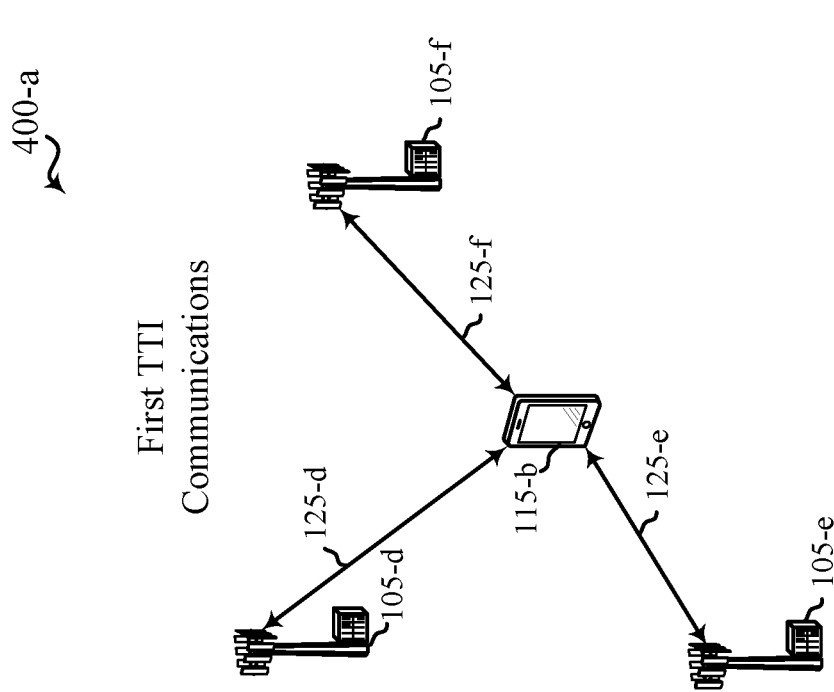
FIG. 4A illustrates an example of a wireless communications system that supports CoMP communications having a first TTI duration in accordance with various aspects of the present disclosure.

FIG. 4A and FIG. 4B illustrate examples of a wireless communications system that supports CoMP communications having different TTI durations in accordance with aspects of the present disclosure. The wireless communications system of FIG. 4A and FIG. 4B may be an example of portions of the wireless communications systems 100 or 200 described with reference to FIG. 1 or 2, and may include base stations 105 in CoMP cooperating sets that may use communications having different TTI durations to communicate with a UE 115-*b*. The base stations 105 may be examples of base stations 105 described with reference to FIG. 1 or 2, and UE 115-*b* may be an example of the UEs 115 described with reference to FIG. 1 or 2.

A first supported mode of operation 400-*a* of the wireless communications system is illustrated in FIG. 4A, in which base stations 105-*d*, 105-*e*, and 105-*f* may utilize CoMP communication with UE 115-*b* using first TTI communications. In the example of FIG. 4A, base station 105-*d* may communicate with UE 115-*b* via communication link 125-*d*, base station 105-*e* may communicate with UE 115-*b* via communication link 125-*e*, and base station 105-*f* may communicate with UE 115-*b* via communication link 125-*f*. Each of the communication links 125-*d*, 125-*e*, and 125-*f* may provide communications using the first TTI, such as a subframe-based 1 ms TTI, for example. A second supported mode of operation 400-*b* of the wireless communications system is illustrated in FIG. 4B, in which the same set of base stations 105-*d*, 105-*e*, and 105-*f* may support communications using a second TTI, such as a low latency TTI, for example. In the example of FIG. 4B, base station 105-*e* and base station 105-*f* may utilize CoMP communication with UE 115-*b* using second TTI communications.

In the example of FIG. 4B, base station 105-*e* may perform low latency TTI communications with UE 115-*b* via communication link 125-*g*, and base station 105-*f* may perform low latency TTI communications with UE 115-*b* via communication link 125-*h*. In this example, base station 105-*d* may support low latency TTI communications, but may not provide such communications to UE 115-*b* due to, for example, low latency TTI communications having a relatively small coverage area and UE 115-*b* being outside of the low latency coverage area for base station 105-*d*. In some deployments, communications using low latency TTIs may have a smaller coverage area than communications using longer-duration TTIs (e.g., communications with 1 ms subframe-based TTIs). Additionally, in some examples, a coverage area for uplink transmissions using shorter duration TTIs may be smaller than a coverage areas for downlink transmissions using shorter duration TTIs. This is but one example of many as to why base station 105-*d* may not provide low latency communications with UE 115-*b*, as will be readily understood by one of skill in the art.

The CoMP communications of the first supported mode of operation 400-*a* and the second supported mode of operation 400-*b* may each include, for example, DPS, JT, or CBF CoMP transmissions, or a combination thereof. In some examples, low latency communications may provide relatively fast CSI feedback, which may allow a DPS CoMP transmission scheme to efficiently select a transmission point for different low latency TTIs, and may allow for more efficient communications. In some examples, the UE 115-*b* may have a different serving cell for first TTI communications in the first supported mode of operation 400-*a* and, at a given point of time, the UE 115-*b* may have a same or different serving cell for second TTI communications in the second supported mode of operation 400-*b*. In various examples, each of the base stations 105 in a portion of a wireless network, such as those shown by the first supported mode of operation 400-*a* or the second supported mode of operation 400-*b*, may support dual TTI communications. In some examples, each of the base stations 105 that may provide coverage to UE 115-*b* may be included in a first CoMP cooperating set for the first TTI communications, with a subset of the base stations 105-*b* of the base stations 105 in the first CoMP cooperating set being included in a second CoMP cooperating set for the second TTI communications.

As discussed above, in some examples, a first set of parameters may be determined for the first TTI communications, a second set of parameters may be determined for the second TTI communications, and a first parameter in the second set of parameters may be associated with a corresponding parameter in the first set of parameters. Communications may then be performed using one or both of the first TTI or the second TTI and the first parameter. The first parameter, as will be discussed in more detail below, may be used to share any of a number of communications-related parameters, such as time/frequency-tracking parameters, between transmissions using the different TTIs. As mentioned above, in some instances UE 115-*b* may be outside of a coverage area of a base station 105 for one TTI, but within a coverage area of the base station 105 for another TTI. In the event that UE 115-*b* is not within a coverage area of two or more base stations 105 for communications using one of the TTIs but within a coverage area of two or more base stations 105 for communications using another TTI, CoMP communications may be enabled only for the TTI having multiple base stations of coverage. In certain examples, downlink communications for the second TTI communications may be low latency CoMP communications that may be CRS or DM-RS based.

Various parameters may be determined for communications different TTIs. Several of such parameters may be related to CSI feedback. In some examples, UE 115-*b* may be configured with low latency CoMP communications using second TTI communications, as well as with first TTI CoMP communications. In some examples, two or more CSI processes may be configured for the UE 115-*b*, and in some cases up to four CSI processes may be used for CoMP communications using second TTI communications that may have a shorter duration TTI than first TTI communications (although more or fewer CSI processes may be used in certain examples). The CSI processes for the second TTI communications, as well as CSI processes for the first TTI communications, may be configured and/or triggered periodically or aperiodically, such as via a trigger transmitted in a control channel communication.

In some examples, an association may be defined between CSI processes of the first TTI communications and the second TTI communications, and in some examples CSI for the second TTI communications may be based on differential reporting from one or more CSI processes of the first TTI communications. For example, UE 115-*b* may be configured with two CSI processes for second TTI communications, and four CSI processes for first TTI communications. In such examples, an exemplary association may be that a first CSI process for the second TTI communications is associated with a first CSI process the first TTI communications; and a second CSI process for the second TTI communications may be associated with a second CSI process for the first TTI communications. Such association definitions may be predefined, or may be based on signaling, such as RRC signaling, for example. As a result, the two associated CSI processes may share the same RI, PMI, PTI, etc. (e.g., the RI of a second TTI CSI process may be inherited from the RI of an associated first TTI CSI process). In certain examples, a CQI for the second TTI may be derived as a delta CQI based on the first TTI communications CQI of the associated CSI process. In some examples, a separate codebook may be configured with a subset restriction for second TTI communications and first TTI communications CSI processes. Thus, in such examples, it may be possible to have different RI/PMIs, etc. for first TTI communications and second TTI communications. In some examples, CSI processes of the first TTI communication and the second TTI communications may be associated through a default setting, and the association may be decoupled through RRC configuration.

Various parameters determined for communications according to different TTIs may be related to VCID configuration and management. In some examples, UE 115-*b* may be configured with one or more VCIDs for first TTI communications and for second TTI communications. According to some legacy deployments, up to two downlink CoMP VCIDs may be configured, or one uplink CoMP VCID may be configured, for CoMP communications using, for example, a subframe-based TTI such as first TTI communications in the example of FIG. 4A. In some aspects of the present disclosure, VCID configuration(s) for second TTI communications in the example of FIG. 4B, such as low latency TTI communications, may be separately configured from VCID configuration(s) for the first TTI communications. Such a design may provide flexibility in the management and configuration of VCIDs.

Additionally or alternatively, in some examples, such separately configured VCIDs may be provided with an association between VCID(s) for first TTI communications, in order to facilitate sharing of one or more time or frequency tracking parameters. For example, a first VCID of second TTI communications may be associated with a first VCID of first TTI communications. Thus, although such VCIDs may be separately configured, certain VCIDs of the different TTI communications may be associated with another VCID. In other examples, VCID(s) of the second TTI communications may not be separately configured, but instead may re-use the same VCID configuration from the first TTI communications. In the event that two VCIDs are configured for the first TTI communications, various examples may provide that the second TTI communications may be configured with one or two VCIDs.

In some examples, for DM-RS based downlink shared channel transmissions, an indicator may be included in a downlink control channel to indicate which VCID to use for a downlink shared channel transmission. In certain examples, downlink control channel transmissions (e.g., physical downlink control channel (PDCCH) transmissions) may have a two-stage operation, in which certain less frequent transmissions may be provided for information that may change relatively infrequently, and other more frequent transmissions may be provided for control channel information that changes relatively frequently. In such examples, a VCID indicator may be provided in either stage of control channel signaling, depending upon how frequently it may be desired to change such a VCID (or PQI configuration, as will be discussed below). While VCID information for shared channel transmissions may be signaled in a control channel, VCID information for control channel transmissions, according to some examples, may be predetermined. For example, if two VCIDs are configured for shared channel transmissions, a first VCID may be predefined for use in a control channel transmission. In other examples, a first VCID may be determined for a first control channel decoding candidate, and a second VCID may be determined for a second control channel decoding candidate.

Also, as discussed above, various of the parameters may be determined for communications different TTIs may be related to PQI configuration and management. In some examples, UE 115-*b* may be configured with a separate PQI configuration for second TTI communications compared to first TTI communications, or may be configured to re-use a PQI for first TTI communications for second TTI communications. In examples where a separate PQI configuration may be provided, an association with a corresponding PQI of the first TTI may be provided, to allow, for example, sharing of time or frequency tracking parameters, sharing of rate matching parameters, etc. As discussed above, PQI configuration may provide a number of items of information, including, QCL assumptions between DM-RS and NZP CSI-RS, CRS configuration for rate matching (CRS ports, frequency shift), ZP CSI-RS for rate matching, multi-broadcast signal-frequency network (MBSFN) configuration, and a PDSCH starting symbol. Also as discussed above, a UE, such as UE 115-*b*, may be configured with four sets of PQI states, and a set may be selectable based on a two-bit PQI that may be transmitted in a DCI transmission. According to some examples, one or more bits may be included in control channel transmissions for second TTI communications that may indicate which PQI configuration to use for one or more second TTI transmissions. In some examples, such an indicator may be a two-bit indicator, such as discussed above, or may be a one-bit indicator for two possible PQI configurations. Such an indicator may be transmitted, similarly as discussed above with respect to VCID, in one stage of a two-stage control channel signaling. In some examples, PQI configuration for control channel transmissions may be based on a pre-determined PQI configuration, such as a first PQI configuration for shared channel transmissions, for example. In other examples, similarly as discussed above with respect to VCID configuration, a first PQI configuration may be determined for a first control channel decoding candidate and a second PQI configuration may be determined for a second control channel decoding candidate.

In some examples, for CRS based rate-matching as part of a PQI configuration for second TTI transmissions, such rate-matching may only be applicable to symbols where CRS may be present. That is, for a non-CRS symbol, the CRS-based rate-matching may be ignored for control channel or shared channel transmissions. Likewise, similar handling may be applied to NZP CSI-RS and ZP CSI-RS transmissions. In some examples, a determination may be made as to whether a transmission includes a CRS symbol or a CSI-RS symbol. Such a determination of whether a symbol is a CRS symbol or a CSI-RS symbol may be implicit or explicit. In some examples, CRS symbols may be implicitly derived based on the number of CRS ports, and CSI-RS symbols may be derived based on a RRC configuration (e.g., RRC indicates which symbol is a CSI-RS symbol). In certain examples, CRS or CSI-RS symbols may be explicitly signaled, such as through a bitmap of symbols with CRS or CSI-RS, for example.

In some examples, it is possible that DM-RS resources for the second TTI communications may be close in time, or coincide with corresponding DM-RS resources for the first TTI communications. In some examples, it may be assumed that QCL applies between the first TTI communications and the second TTI communications. In certain examples, a QCL association may be based on RRC configuration, either explicitly or implicitly. For example, QCL may be assumed for second TTI communications and first TTI communications if both have the same VCID.

Furthermore, in some examples, a restriction may be placed on how frequently a transmission point can be switched for DPS for second TTI communications. For example, a same transmission point may be specified for second TTI communications for an integer number of TTIs for first TTI communications (e.g., within a 1 ms subframe of first TTI communications). Such a restriction may, in some cases, facilitate enhanced time or frequency tracking for second TTI communications or first TTI communications, and help to reduce implementation complexity at a UE that may implement such dual TTI communications. In other examples, if second TTI communications have a TTI that spans more than one symbol (e.g., 2-symbol TTI), it is possible that two different symbols can be served by different wireless network nodes, which may enhance frequency diversity of a transmission.

Figure 5:
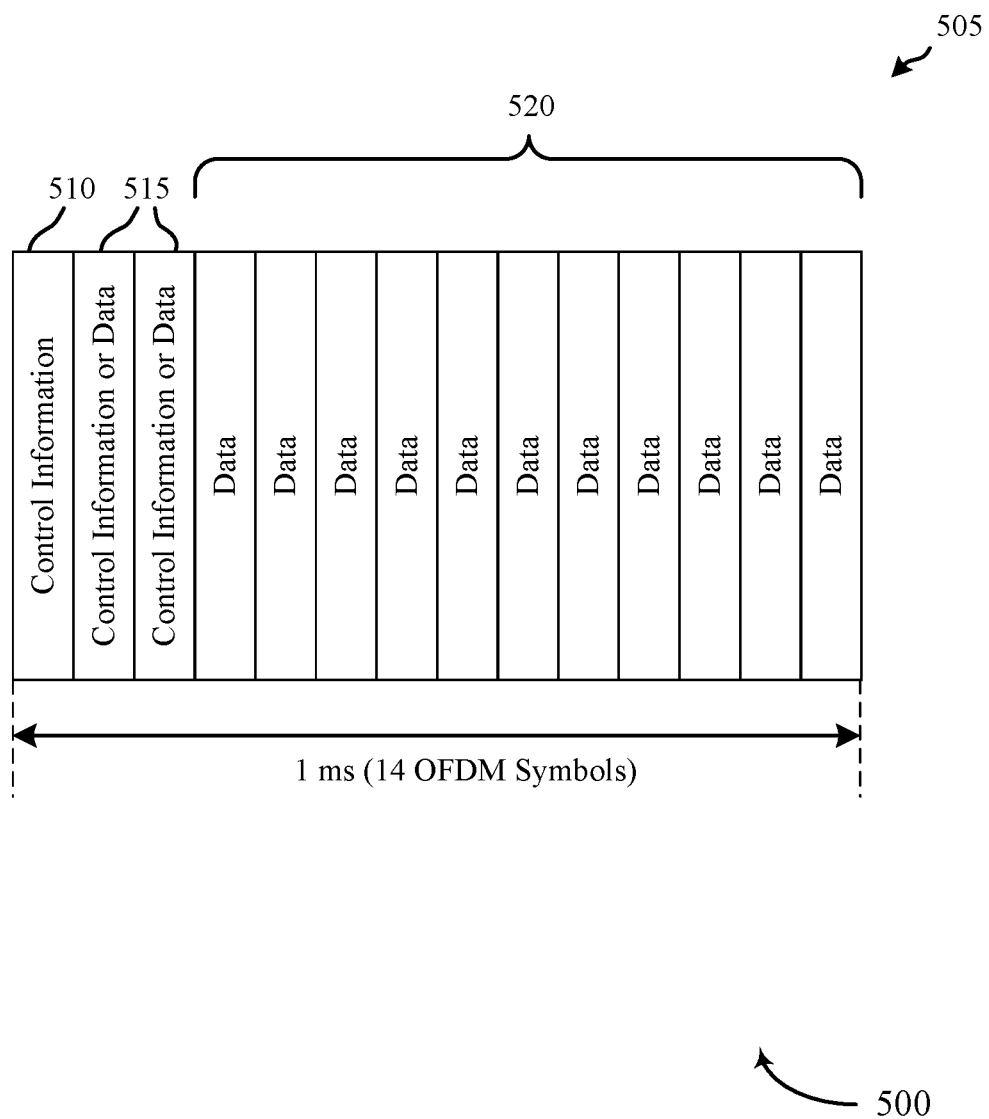
FIG. 5 illustrates an example of OFDM symbols including control information or data that may support CoMP communications using multiple TTI durations in accordance with various aspects of the present disclosure.

As mentioned above, in some examples it may be ambiguous to a wireless network node communicating using second TTI communications as to whether a corresponding symbol transmitted using first TTI communications contains control information or contains a data transmission. For example, certain subframes may have different numbers of symbols that include control information, which may be included in the first one, two, or three symbols of a subframe. FIG. 5 illustrates an example 500 of OFDM symbols including control information or data that may support CoMP communications using multiple TTI durations in accordance with various aspects of the present disclosure. Example 500 may include a subframe 505 that may be transmitted using first TTI communications (e.g., a subframe-level TTI). According to various aspects of the disclosure, a wireless network node (e.g., a base station 105 or UE 115 described with reference to FIG. 1, 2 or 4) may configure subframe 505 such that a first symbol 510 may always include control information, followed by second and third symbols 515 that may include control information or data. The remaining symbols 520 of subframe 505 may always include data.

CoMP transmission schemes for communications using a second TTI (e.g., a low latency TTI), which may include one or more parameters that are associated with first TTI communications parameters, may depend upon on whether the second TTI communications coincides with a control region or a data region according to the first TTI. Additionally or alternatively, physical layer structure for the second TTI may be different depending on whether the transmission of the second TTI coincides with a control region or a data region according to the first TTI. As an example, a transmission of the second TTI may be constructed based on a resource element group (REG) or a control channel element (CCE) structure when the transmission timing coincides with a control region according to the first TTI. In another example, a transmission of the second TTI may be constructed based on a resource block structure when the transmission timing coincides with a data region according to the first TTI. As a result, communications using a second TTI may depend upon on whether the second TTI communications coincides with a control region or a data region according to the first TTI. As mentioned, for second TTI communications, it may be known that the first symbol 510 is always in the control region according to the first TTI, while the fourth through the last symbols 520 are always the data region according to the first TTI (assuming system bandwidths is >10 RBs). However, the second and third symbols 515 may be unknown, including such examples that support dynamic cell switching. In some examples, for the first symbol 510, which always belongs to the control region according to the first TTI, CoMP communications may be disabled at least for control channel transmissions using the second TTI communications, and in some examples is disabled for shared channel transmissions as well so as to provide control channel and shared channel transmissions that are both based on PCI (either CRS or DM-RS based).

In some examples, CoMP communications may be supported during the first symbol 510, using DM-RS for demodulation from one or more previous symbol(s) (e.g., symbol 12 and 13 in a previous subframe), and using a VCID and/or PQI that may be indicated using a control channel in the given symbol, or in an earlier symbol. In still other examples, CoMP communications may be supported during the first symbol 510, using CRS for demodulation. In such examples, control channel transmissions may be based on one or two VCIDs which may be associated with different decoding candidates. Thus, CRS-based CoMP may be provided in the first symbol 510, with DM-RS-based CoMP in one or more other symbols.

For the second and third symbols 515, in some examples, a subframe type of the subframe and a format indicator channel may be used to determine whether the second and third symbols 515 contain control information or data. For example, based on physical control format indicator channel (PCFICH) and a subframe type (e.g., MBSFN vs. non-MBSFN, special subframes in TDD, etc.) of the serving node, one or both of the second and third symbols 515 may be determined to coincide with the control region or data region according to the first TTI for the serving node. In some examples, CoMP communications may be disabled, providing PCI-based transmissions, or enabled providing CRS or DM-RS based transmissions. In other examples, CoMP communications may be disabled if it is determined that one or both of symbols 515 coincide with the control region according to the first TTI, or may be enabled if it is determined that one or both of symbols 515 coincide with the data region according to the first TTI.

In some examples, both symbols 515 may be uniformly treated as coinciding with the control region or the data region according to the first TTI, and CoMP communications may be disabled for the duration of the second and third symbols 515. Alternatively, CoMP may be enabled for such second and third symbols 515 and may be based on CRS or DM-RS transmissions. In some examples, the second and third symbols 515 may be treated as control symbols from a control channel perspective, but for shared channel transmissions it may be indicated whether one or both of second and third symbols 515 are control or data symbols. In such examples, if the second or third symbols 515 are control symbols, shared channel resource allocation may be based on a resource element group (REG) or a control channel element (CCE), and if the second or third symbols are data symbols, shared channel resource allocation may be based on RBs (in this case, shared channel transmission may be rate matched around CCE based control channel transmissions). In some examples, determination of control versus data transmissions in second and third symbols 515 may be made through blind decoding of transmissions during the symbols 515, under the assumption that the symbols 515 may coincide with either the control region or the data region according to the first TTI. According to some aspects, second TTI communications may have a different design when coinciding with a control region according to the first TTI (e.g., CCE based transmissions) as compared to coinciding with a data region according to the first TTI (e.g., RB-based transmissions). As a result, such an option incurs more blind decodes; or same blind decodes with restrictions on the number of decoding candidates. In some examples, a wireless network node may dynamically indicate whether second and third symbols 515 comprise control or data region symbols (e.g., using legacy PDCCH).

Figure 6:
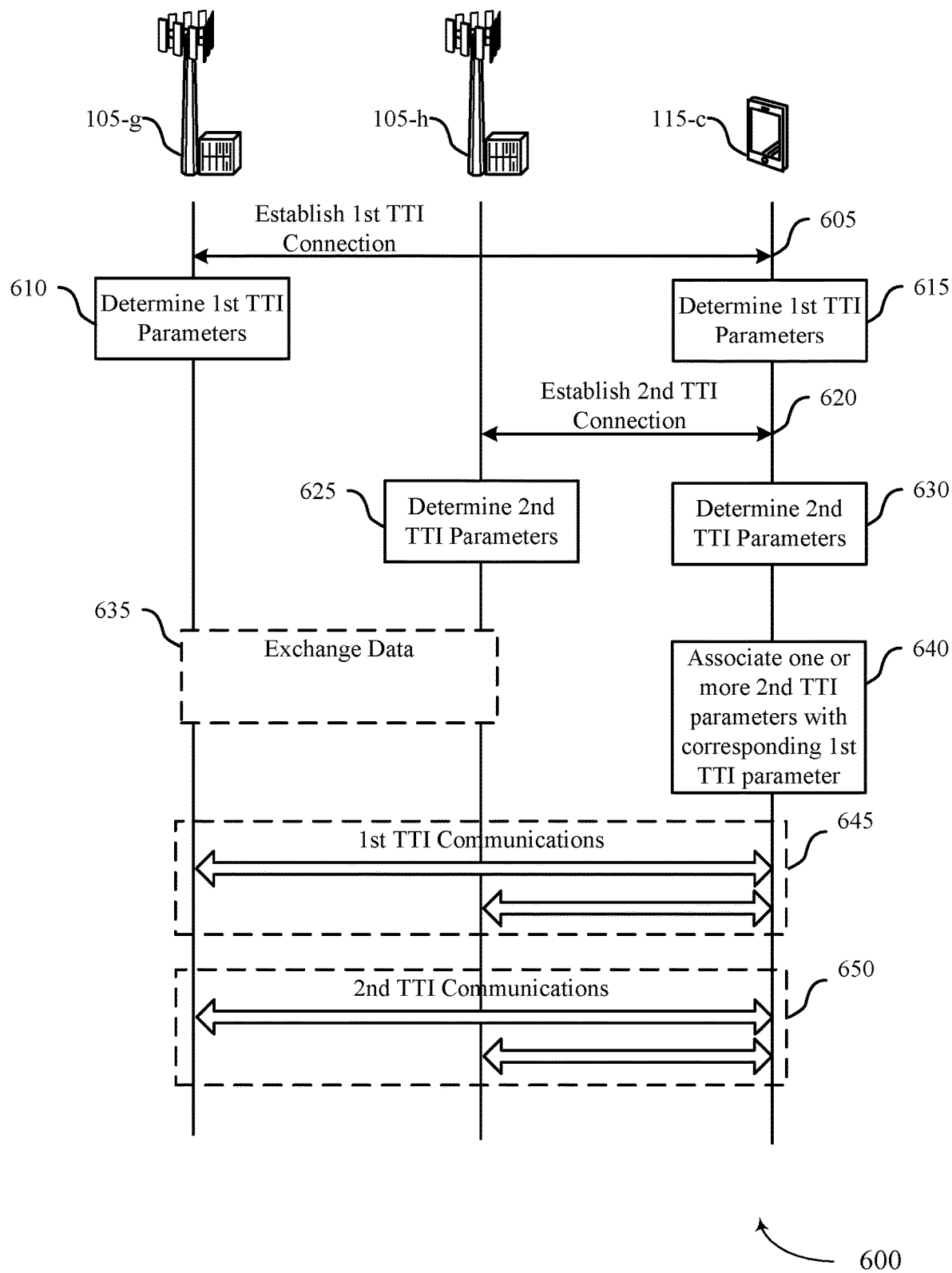
FIG. 6 illustrates an example of a process flow for coordinated communications using multiple TTI durations in accordance with various aspects of the present disclosure.

FIG. 6 illustrates an example of a process flow 600 for coordinated communications using multiple TTI durations in accordance with various aspects of the present disclosure. Process flow 600 may include a UE 115-*c*, which may be an example of aspects of a UE 115 described with reference to FIGS. 1-5. Process flow 600 may also include a first base station 105-*g* and a second base station 105-*h*, which may be examples of aspects of base stations 105 described with reference to FIGS. 1-5. Although described with reference to base stations 105 and UE 115, the steps of process flow 600 may be performed by any set of wireless network nodes that may provide coordinated communications using multiple TTIs.

At step 605, base station 105-*g* may establish a first TTI connection with UE 115-*c*. The first TTI connection may provide communications having a first TTI, such as 1 ms subframe-based TTI. At block 610, the first base station 105-*g* may determine first TTI parameters, which may include various of the parameters as discussed with reference to FIGS. 1-5. Likewise, at block 615, the UE 115-*c* may determine first TTI parameters, which may include various of the parameters discussed with reference to FIGS. 1-5. At step 620, the second base station 105-*h* may establish a second TTI connection with UE 115-*c*, which may provide communications having a second TTI that may have a shorter duration than the first TTI, such as a symbol-based TTI, two-symbol TTI, four-symbol TTI, slot-duration TTI, or otherwise low latency TTI, as discussed above with reference to FIGS. 1-5. At step 625, the second base station 105-*h* may determine second TTI parameters, as discussed with reference to FIGS. 1-5. At step 630, the UE 115-*c* may likewise determine second TTI parameters, as discussed with reference to FIGS. 1-5. At step 635 the first base station 105-*g* and the second base station 105-*h* may exchange data, such as data to enable one or more CoMP transmission schemes. At block 640, the UE 115-*c* may associate one or more second TTI parameters with a corresponding first TTI parameter, in a manner similarly as described with reference to FIGS. 1-5.

At step 645, first TTI communications may be conducted, which may be between the UE 115-*c* and one or both of the base stations 105 in a manner similarly as described with reference to FIGS. 1-5. In some examples, such first TTI communications may be based on one or more parameters of the first TTI, or one or more parameters of the second TTI. At step 650, second TTI communications may be conducted, which may be between the UE 115-*c* and one or both of the base stations 105 in a manner similarly as described with reference to FIGS. 1-5. In some examples, such second TTI communications may be based on one or more parameters of the first TTI, in a manner similarly as described with reference to FIGS. 1-5. The first TTI communications at step 645, and the second TTI communications at step 650, may provide CoMP communications between the UE 115-*c* and one or both of base stations 105, as discussed with reference to FIGS. 1-5.

Figure 7:
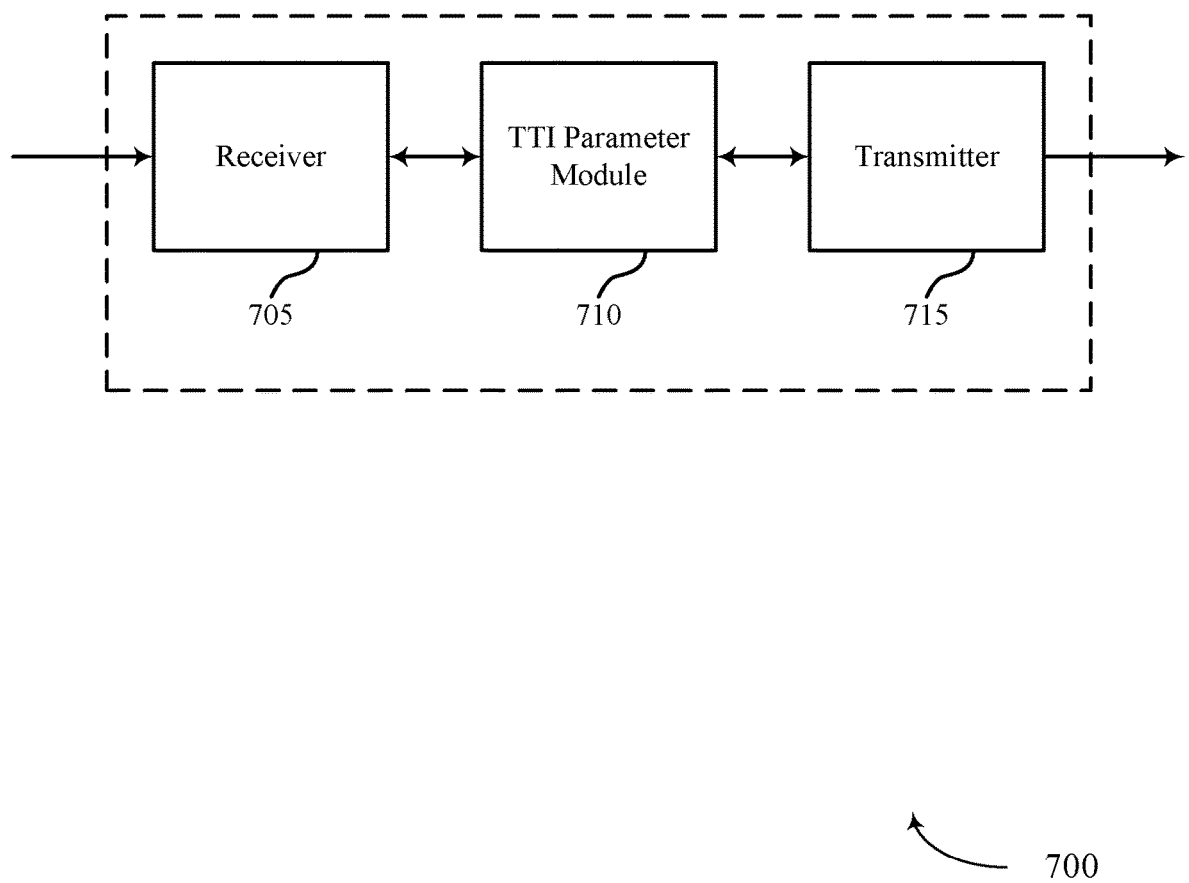
FIG. 7 shows a block diagram of a wireless device that supports coordinated communications using multiple TTI durations in accordance with various aspects of the present disclosure.

FIG. 7 shows a block diagram of a wireless device 700 that supports coordinated communications using multiple TTI durations in accordance with various aspects of the present disclosure. Wireless device 700 may be an example of aspects of a UE 115 or a base station 105 described with reference to FIGS. 1-6. Wireless device 700 may include a receiver 705, a TTI parameter module 710, or a transmitter 715. Wireless device 700 may also include a processor. Each of these components may be in communication with one another.

The receiver 705 may receive information such as packets, user data, or control information associated with various information channels (e.g., control channels, data channels, CoMP based transmission, or parameter information, etc.). Information may be passed on to the TTI parameter module 710, and to other components of wireless device 700. In some examples, the receiver 705 may receive first TTI communications, second TTI communications, or both. In some examples, the receiver 705 may receive the first TTI communications, second TTI communications, or both, as DPS CoMP communications, CBF CoMP communications, or JT CoMP communications.

The TTI parameter module 710 may determine a first set of parameters for first TTI communications, and determine a second set of parameters for second TTI communications, and may associate a first parameter in the second set of parameters with a corresponding parameter in the first set of parameters, as discussed above with reference to FIGS. 1-6. In other examples, the TTI parameter module 710 may, in combination with, e.g., the receiver 705, identify first TTI communications, identify second TTI communications, and may determine a CoMP transmission scheme of a transmission using the second TTI based on a location in the first TTI of the transmission using the second TTI, in a manner similarly as discussed above with reference to FIGS. 1-6.

The transmitter 715 may transmit signals received from other components of wireless device 700. In some examples, the transmitter 715 may be collocated with the receiver 705 in a transceiver module. The transmitter 715 may include a single antenna, or it may include a several antennas. In some examples, the transmitter 715 may be collocated with a receiver in a transceiver module. For example, the transmitter 715 may be an example of aspects of the transceiver(s) 1035 and/or antenna(s) 1040 described with reference to FIG. 10, or the transceiver(s) 1135 and/or antenna(s) 1140 described with reference to FIG. 11.

Figure 8:
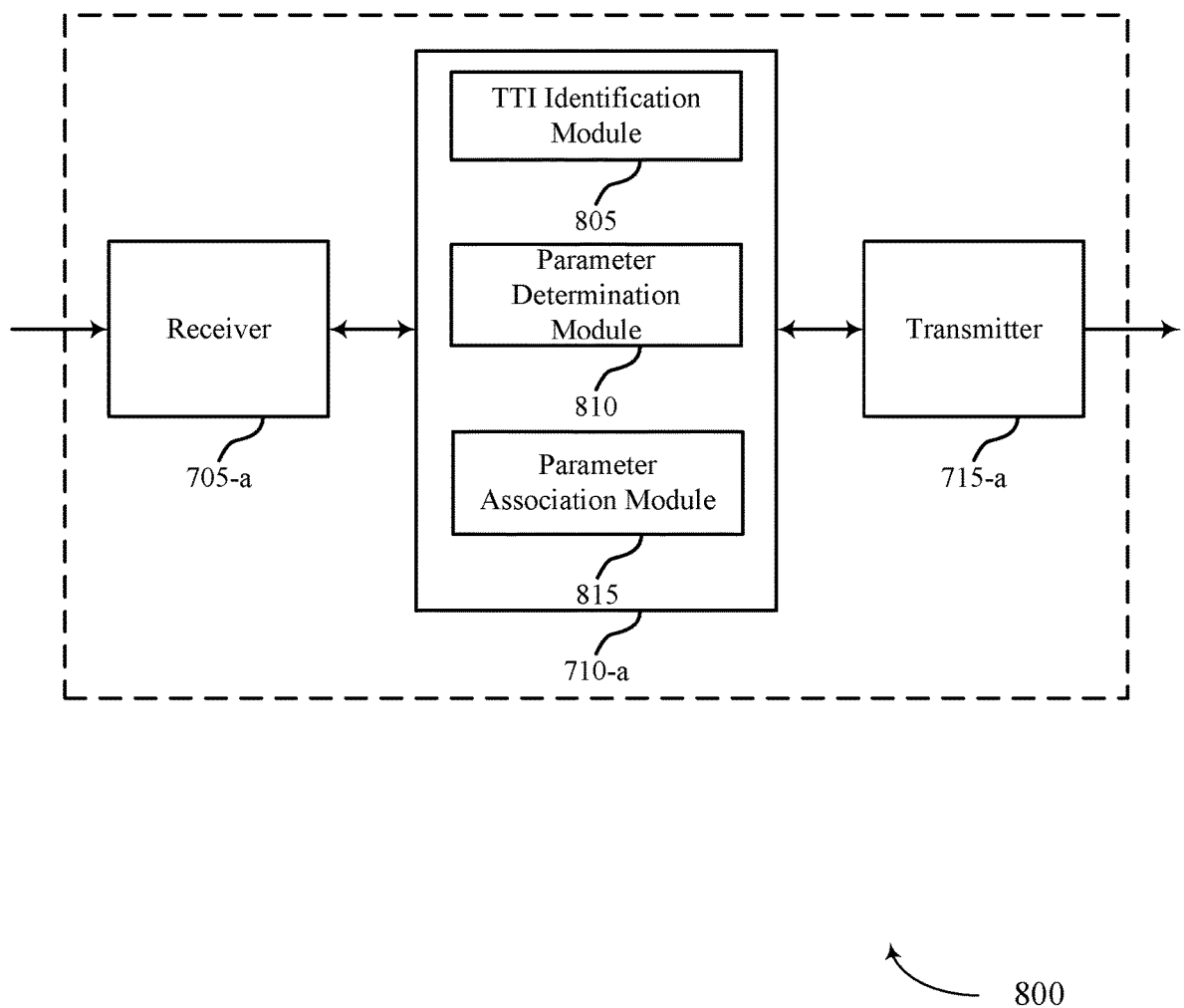
FIG. 8 shows a block diagram of a wireless device that supports coordinated communications using multiple TTI durations in accordance with various aspects of the present disclosure.

FIG. 8 shows a block diagram of a wireless device 800 that supports coordinated communications using multiple TTI durations in accordance with various aspects of the present disclosure. Wireless device 800 may be an example of aspects of a wireless device 700 described with reference to FIG. 7, or a UE 115 or a base station 105 described with reference to FIGS. 1-6. Wireless device 800 may include a receiver 705-a, a TTI parameter module 710-a, or a transmitter 715-a. Wireless device 800 may also include a processor. Each of these components may be in communication with one another. The TTI parameter module 710-a may also include a TTI identification module 805, a parameter determination module 810, and a parameter association module 815.

The receiver 705-a may be an example of aspects of a receiver 705 described with reference to FIG. 7, and may receive information which may be passed on to TTI parameter module 710-a, and to other components of wireless device 800. The TTI parameter module 710-a may perform the operations described above with reference to FIG. 7. The transmitter 715-a may be an example of aspects of a transmitter 715 described with reference to FIG. 7, and may transmit signals received from other components of wireless device 800.

The TTI identification module 805 may identify a TTI that is to be used for communications, such as a low latency symbol-level TTI or a subframe-level TTI, as described above with reference to FIGS. 1-6. The parameter determination module 810 may determine one or more parameters associated with communications using one or more different TTIs. For example, the parameter determination module 810 may determine a first set of parameters for communications using a first TTI, and may determine a second set of parameters for communications using a second TTI, wherein the second TTI has a shorter duration than the first TTI, as described above with reference to FIGS. 1-6. In some examples, the parameter determination module 810 may determine one or more of a CSI-based parameter, a VCID parameter, or a PQI parameter associated with communications using two or more different TTIs, as described above with reference to FIGS. 1-6. The parameter association module 815 may associate a parameter of the second TTI communications with a corresponding parameter of the first TTI communications, in a manner similarly as described above with reference to FIGS. 1-6. For example, parameter association module 815 may associate at least one of a time tracking parameter, or a frequency tracking parameter, or both, of the second TTI communications with corresponding parameter(s) of the first TTI communications. Such parameters may include, for example, delay spread, receive power, frequency shift, Doppler spread, or received timing, or any combination thereof.

Figure 9:
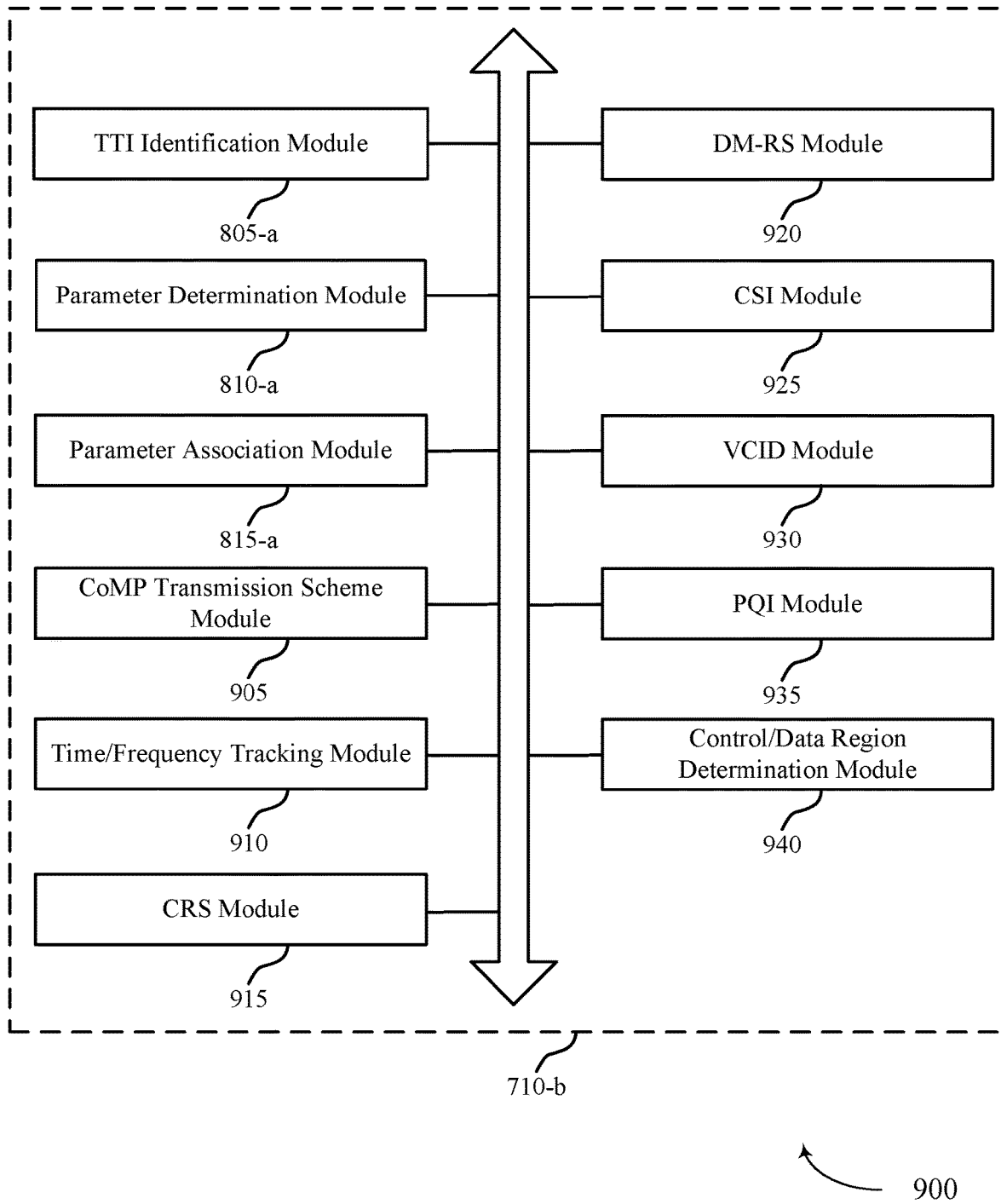
FIG. 9 shows a block diagram of a TTI parameter module that supports coordinated communications using multiple TTI durations in accordance with various aspects of the present disclosure.

FIG. 9 shows a block diagram 900 of a TTI parameter module 710-b that supports coordinated communications using multiple TTI durations in accordance with various aspects of the present disclosure. The TTI parameter module 710-b may be a component of a wireless device, such as a wireless device 700 or 800 described with reference to FIG. 7 or 8. The TTI parameter module 710-b may be an example of aspects of a TTI parameter module 710 described with reference to FIG. 7 or 8. The TTI parameter module 710-b may include a TTI identification module 805-a, a parameter determination module 810-a, and a parameter association module 815-a. Each of these modules may be examples of aspects of the respective modules described above with reference to FIG. 8. The TTI parameter module 710-b may also include a CoMP transmission scheme module 905, a time/frequency tracking module 910, a CRS module 915, a DM-RS module 920, a CSI module 925, a VCID module 930, a PQI module 935, or a control/data region determination module 940. The various modules of TTI parameter module 710-b may be in communication with one another.

The CoMP transmission scheme module 905 may manage transmission or receipt of CoMP communications to or from a wireless device 700 or 800, such as dynamic point selection (DPS) CoMP communications, coordinated beamforming (CBF) CoMP communications, or joint transmission (JT) CoMP communications, similarly as discussed above with reference to FIGS. 1-6. In some examples, CoMP transmission scheme module 905 may identify a first plurality of nodes in a first CoMP cooperating set of nodes and a second plurality of nodes in a second CoMP cooperating set of nodes, in which the first CoMP cooperating set of nodes may communicate using the first TTI and the second CoMP cooperating set of nodes may communicate using the second TTI, and manage CoMP transmissions with the identified CoMP cooperating sets of nodes, similarly as discussed above with reference to FIGS. 1-6. In some examples, CoMP transmission scheme module 905 may disable a CoMP transmission scheme when a transmission using the second TTI coincides with a control region of the first TTI, and may enable a CoMP transmission scheme when a transmission using the second TTI coincides with a data region of the first TTI communications, similarly as discussed above with reference to FIGS. 1-6. In further examples, CoMP transmission scheme module 905 may enable a CoMP transmission scheme based on a common reference signal (CRS) when a transmission using the second TTI coincides with a control region according to the first TTI, and may enable a CoMP transmission scheme based on a demodulation reference signal (DM-RS) when the transmission using the second TTI coincides with a data region according to the first TTI, similarly as discussed above with reference to FIGS. 1-6. In various examples the operations of the CoMP transmission scheme module 905 may be performed in coordination with a transmitter or receiver. For example, transmitter 715 or receiver 705 described with reference to FIG. 7 or 8, transceiver(s) 1035 and antenna(s) 1040 described with reference to FIG. 10, transceiver(s) 1135 and antenna(s) 1140 described with reference to FIG. 11 may, in combination with CoMP transmission scheme module 905 be used to perform the operations described herein.

The time/frequency tracking module 910 may determine at least one of a time tracking parameter of a node, or a frequency tracking parameter of the node, or both, for use in first TTI communications or second TTI communications, similarly as discussed above with reference to FIGS. 1-6. Such time or frequency tracking parameters may include, for example, delay spread, receive power, frequency shift, Doppler spread, or received timing, or any combination thereof.

The CRS module 915 may configure or receive CRS based communications, similarly as discussed above with reference to FIGS. 1-6. The DM-RS module 920 may configure or receive DM-RS based communications, similarly as discussed above with reference to FIGS. 1-6. The CSI module 925 may manage one or more CSI processes associated with first TTI communications and/or second TTI communications, similarly as discussed above with reference to FIGS. 1-6. In some examples, the CSI module 925 may trigger the two or more CSI processes, or receive a trigger to start the two or more CSI processes, in a periodic manner or in an aperiodic manner. In certain examples, a parameter for the CSI process for the second TTI communications may be associated with a corresponding CSI process for communications using the first TTI, and such an association between the CSI processes may be predefined or signaled through RRC signaling. The parameter for the CSI process for the second TTI may include, for example, at least one of a RI, a PMI, or a PTI, or any combination thereof. In some examples, the RI, PMI, or PTI of the parameter for the CSI process for the second TTI may be preconfigured to be the same as the corresponding parameter used for communications using the first TTI, and a signal may be transmitted to disassociate the RI, PMI, or PTI through RRC signaling. In certain examples, a number of CSI processes for communications using the second TTI may be less than or equal to a number of CSI processes for communications using the first TTI, similarly as discussed above with reference to FIGS. 1-6.

In various examples the operations of the CRS module 915, the DM-RS module 920, or the CSI module 925 may be performed in coordination with a transmitter or receiver. For example, transmitter 715 or receiver 705 described with reference to FIG. 7 or 8, transceiver(s) 1035 and antenna(s) 1040 described with reference to FIG. 10, transceiver(s) 1135 and antenna(s) 1140 described with reference to FIG. 11 may, in combination with the CRS module 915, the DM-RS module 920, or the CSI module 925, be used to perform the operations described herein.

The VCID module 930 may manage VCID configuration of the wireless device 700 or 800, in a manner similarly as discussed above with reference to FIGS. 1-6. In some examples, a VCID configuration for communications using the second TTI may be set to be a same VCID configuration as for communications using the first TTI, or may be different from a VCID configuration for communications using the first TTI. In the event that the VCID configuration for communications using the first TTI is different than the VCID configuration for communications using the second TTO, the VCID configuration for communications using the second TTI may be associated with the VCID configuration for communications using the first TTI. In some examples, a number of VCIDs configured for communications using the second TTI may be less than or equal to a number of VCIDs configured for communications using the first TTI. In certain examples, for a data communication, the VCID using the second TTI or the first TTI may be determined by signaling in a control channel, and for a control channel communication the VCID may be determined based on a decoding candidate of the control channel communication, similarly as discussed above with reference to FIGS. 1-6.

The PQI module 935 may manage PQI configuration of the wireless device 700 or 800, in a manner similarly as discussed above with reference to FIGS. 1-6. In some examples, a PQI configuration for communications using the second TTI may be set to be a same PQI configuration as for communications using the first TTI. The PQI module 935 may, in some examples, set a PQI configuration for communications using the second TTI to be different from a PQI configuration for communications using the first TTI. In some examples, a number of PQI configurations for communications using the second TTI may be less than or equal to a number of PQI configurations for communications using the first TTI. In certain examples, for a data communication, the PQI configuration using the second TTI or the first TTI may be determined by signaling in a control channel, and for a control channel communication, a PQI configuration may be determined based on a decoding candidate, similarly as discussed above with reference to FIGS. 1-6.

The control/data region determination module 940 may manage determination of whether symbols of a first TTI communication are control region symbols or data symbols, in a manner similarly as discussed above with reference to FIGS. 1-6. In some examples, the control/data region determination module 940 may determine a CoMP transmission scheme of a transmission using the second TTI based on a timing of a transmission using the second TTI relative to the first TTI. In some examples, a quantity of OFDM symbols in a control region according to the first TTI is variable, and the control/data region determination module 940 may blindly decode one or more symbols to determine if the OFDM symbols comprise control region OFDM symbols or data region OFDM symbols, similarly as discussed above with reference to FIGS. 1-6. In some examples, a number of OFDM symbols of a control region in the first TTI may be determined based at least in part on a channel format indicator and a type of subframe transmitted using the second TTI, similarly as discussed above with reference to FIGS. 1-6. In other examples, subset of OFDM symbols transmitted using the first TTI may be configured to be control region symbols in the first TTI irrespective of whether each symbol in the subset comprises control information or data. In still further examples, the control/data region determination module 940 may provide signaling indicating a number of OFDM symbols of the control region, similarly as discussed above with reference to FIGS. 1-6.

The components of wireless device 700, wireless device 800, or TTI parameter module 710-*b* may each, individually or collectively, be implemented with at least one application specific integrated circuit (ASIC) adapted to perform some or all of the applicable functions in hardware. Alternatively, the functions may be performed by one or more other processing units (or cores), on at least one integrated circuit (IC). In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 10:
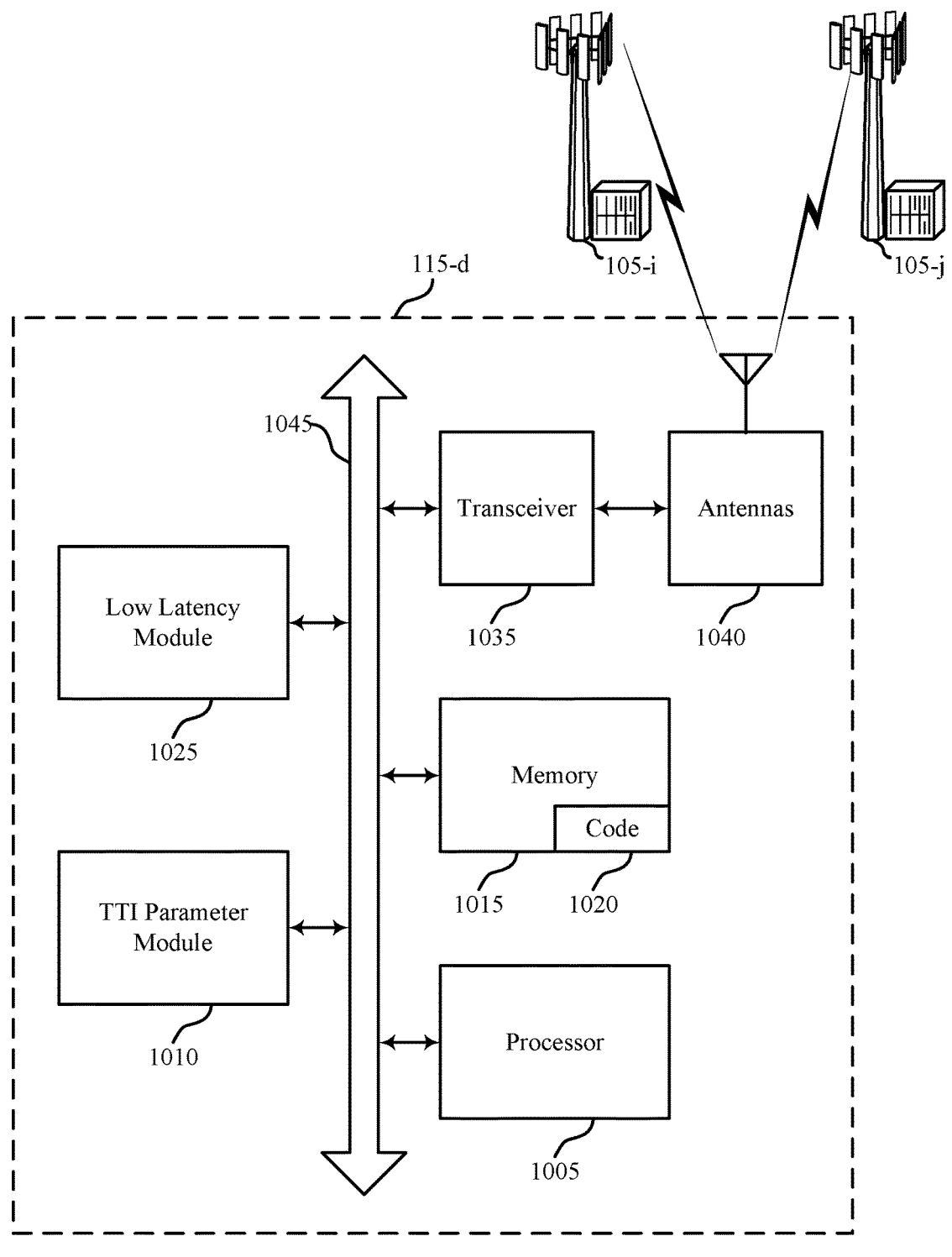
FIG. 10 illustrates a diagram of a system including a UE that supports coordinated communications using multiple TTI durations in accordance with various aspects of the present disclosure.

FIG. 10 shows a diagram of a system 1000 including a UE that supports coordinated communications using multiple TTI durations in accordance with various aspects of the present disclosure. System 1000 may include UE 115-*d*, which may be an example of a UE 115, a wireless device 700, or a wireless device 800 described above with reference to FIGS. 1-9. UE 115-*d* may include a TTI parameter module 1010, which may be an example of a TTI parameter module 710 described with reference to FIGS. 7-10. In some examples, UE 115-*d* may include a low latency module 1025, which may manage aspects of low latency communications for UE 115-*d* in addition to the TTI parameter related aspects managed by TTI parameter module 1010. In some examples, TTI parameter module 1010 and low latency module 1025 may be co-located within a same module. UE 115-*d* may also include components for bi-directional voice and data communications including components for transmitting communications and components for receiving communications. For example, UE 115-*d* may communicate bi-directionally with base stations 105-*i* and/ or 105-*j*, which may communicate with UE 115-*d* using one or more CoMP transmission schemes, similarly as discussed above with reference to FIGS. 1-6.

UE 115-*d* may also include a processor 1005, and memory 1015 (including software/firmware code 1020), a transceiver 1035, and one or more antenna(s) 1040, each of which may communicate, directly or indirectly, with one another (e.g., via buses 1045). The transceiver 1035 may communicate bi-directionally, via the antenna(s) 1040 or wired or wireless links, with one or more networks, as described above. For example, the transceiver 1035 may communicate bi-directionally with a base station 105 or another UE 115. The transceiver 1035 may include a modem to modulate the packets and provide the modulated packets to the antenna(s) 1040 for transmission, and to demodulate packets received from the antenna(s) 1040. While UE 115-*d* may include a single antenna 1040, UE 115-*d* may also have multiple antennas 1040 capable of concurrently transmitting or receiving multiple wireless transmissions.

The memory 1015 may include random access memory (RAM) and read only memory (ROM). The memory 1015 may store computer-readable, computer-executable software/firmware code 1020 including instructions that, when executed, cause the processor 1005 to perform various functions described herein (e.g., low latency communications, TTI parameter determination and association for different TTI communications, etc.). Alternatively, the software/firmware code 1020 may not be directly executable by the processor 1005 but cause a computer (e.g., when compiled and executed) to perform functions described herein. The processor 1005 may include an intelligent hardware device, (e.g., a central processing unit (CPU), a microcontroller, an ASIC, etc.).

Figure 11:
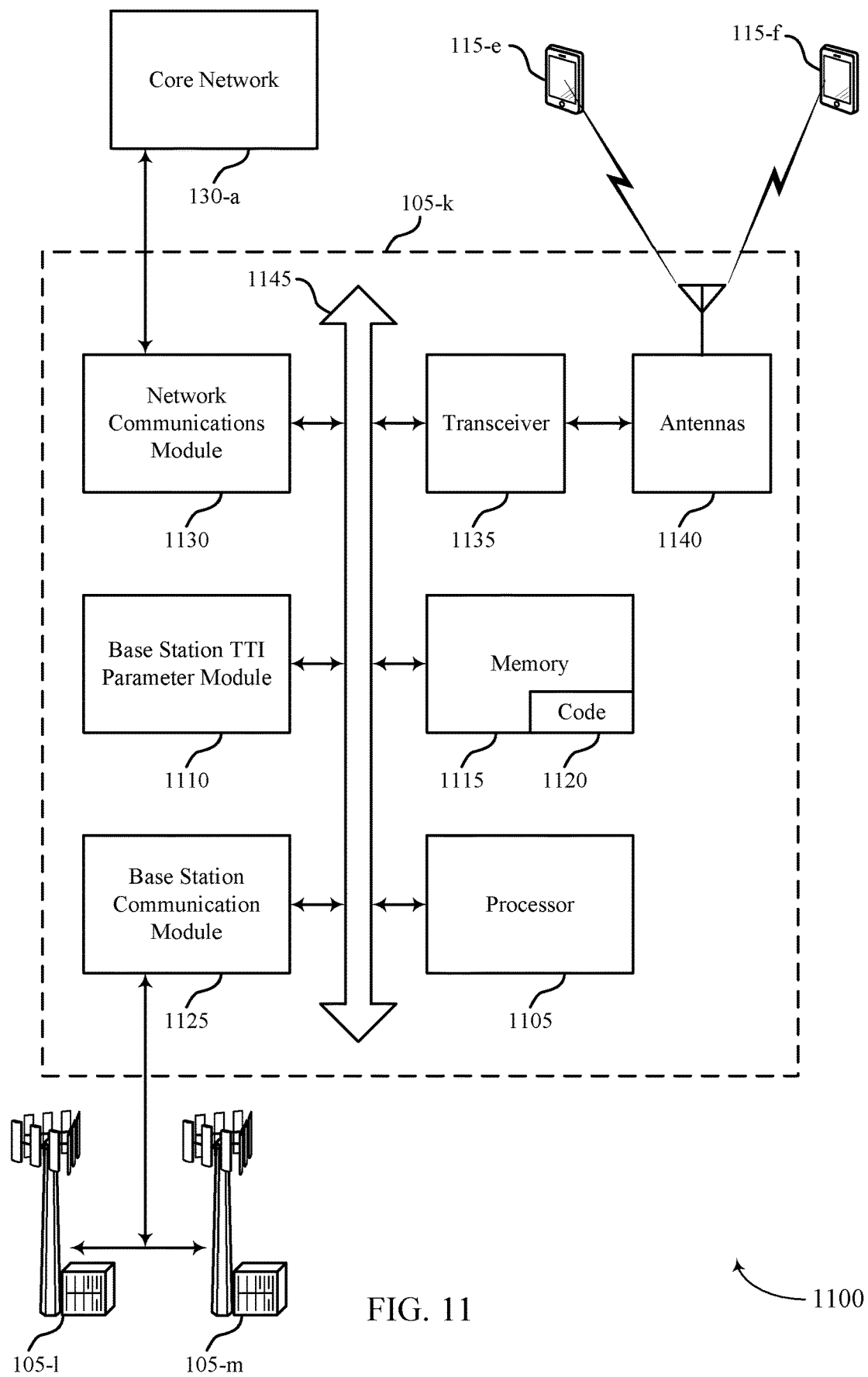
FIG. 11 illustrates a diagram of a system including a base station that supports coordinated communications using multiple TTI durations in accordance with various aspects of the present disclosure.

FIG. 11 shows a diagram of a system 1100 including a base station 105-*k* that supports coordinated communications using multiple TTI durations in accordance with various aspects of the present disclosure. System 1100 may include base station 105-*k*, which may be an example of a base station 105, a wireless device 700, or a wireless device 800 described above with reference to FIGS. 1-9. Base station 105-*k* may include a base station TTI parameter module 1110, which may be an example of a TTI parameter module 710 described with reference to FIGS. 7-9. Base station 105-*k* may also include components for bi-directional voice and data communications including components for transmitting communications and components for receiving communications. For example, base station 105-*k* may communicate bi-directionally with UE 115-*e* or UE 115-*f*.

In some cases, base station 105-*k* may have one or more wired backhaul links. Base station 105-*k* may have a wired backhaul link (e.g., S1 interface, etc.) to the core network 130. Base station 105-*k* may also communicate with other base stations 105, such as base station 105-1 and base station 105-*m* via inter-base station backhaul links (e.g., an X2 interface). Each of the base stations 105 may communicate with UEs 115 using the same or different wireless communications technologies. In some examples, the base stations 105-*k*, 105-1, and 105-*m* may form a CoMP cooperating set for communications with one or more UEs 115 in accordance with the description of FIGS. 1-9. In some cases, base station 105-*k* may communicate with other base stations such as 105-1 or 105-*m* utilizing base station communication module 1125. In some examples, base station communication module 1125 may provide an X2 interface within an LTE/LTE-A wireless communication network technology to provide communication between some of the base stations 105. In some examples, base station 105-*k* may communicate with other base stations through core network 130. In some cases, base station 105-*k* may communicate with the core network 130 through network communications module 1130.

The base station 105-*k* may include a processor 1105, memory 1115 (including software/firmware code 1120), transceiver 1135, and antenna(s) 1140, which each may be in communication, directly or indirectly, with one another (e.g., over bus system 1145). The transceiver 1135 may be configured to communicate bi-directionally, via the antenna (s) 1140, with the UEs 115, which may be multi-mode devices. The transceiver 1135 (or other components of the base station 105-*k*) may also be configured to communicate bi-directionally, via the antennas 1140, with one or more other base stations (not shown). The transceiver 1135 may include a modem configured to modulate the packets and provide the modulated packets to the antennas 1140 for transmission, and to demodulate packets received from the antennas 1140. The base station 105-*k* may include multiple transceivers 1135, each with one or more associated antennas 1140. The transceiver 1135 may be an example of a combined receiver 705 and transmitter 715 of FIG. 7.

The memory 1115 may include RAM and ROM. The memory 1115 may also store computer-readable, computer-executable software/firmware code 1120 containing instructions that are configured to, when executed, cause the processor 1105 to perform various functions described herein (e.g., low latency communications, communications according to different TTIs, etc.). Alternatively, the software code 1120 may not be directly executable by the processor 1105 but be configured to cause the computer, e.g., when compiled and executed, to perform functions described herein. The processor 1105 may include an intelligent hardware device, e.g., a CPU, a microcontroller, an ASIC, etc. The processor 1105 may include various special purpose processors such as encoders, queue processing modules, base band processors, radio head controllers, digital signal processor (DSPs), and the like.

The base station communication module 1125 may manage communications with other base stations 105. The communications management module may include a controller or scheduler for controlling communications with UEs 115 in cooperation with other base stations 105. For example, the base station communication module 1125 may coordinate scheduling for transmissions to UEs 115 for various CoMP techniques such as JT, CBF, or DPS.

Figure 12:
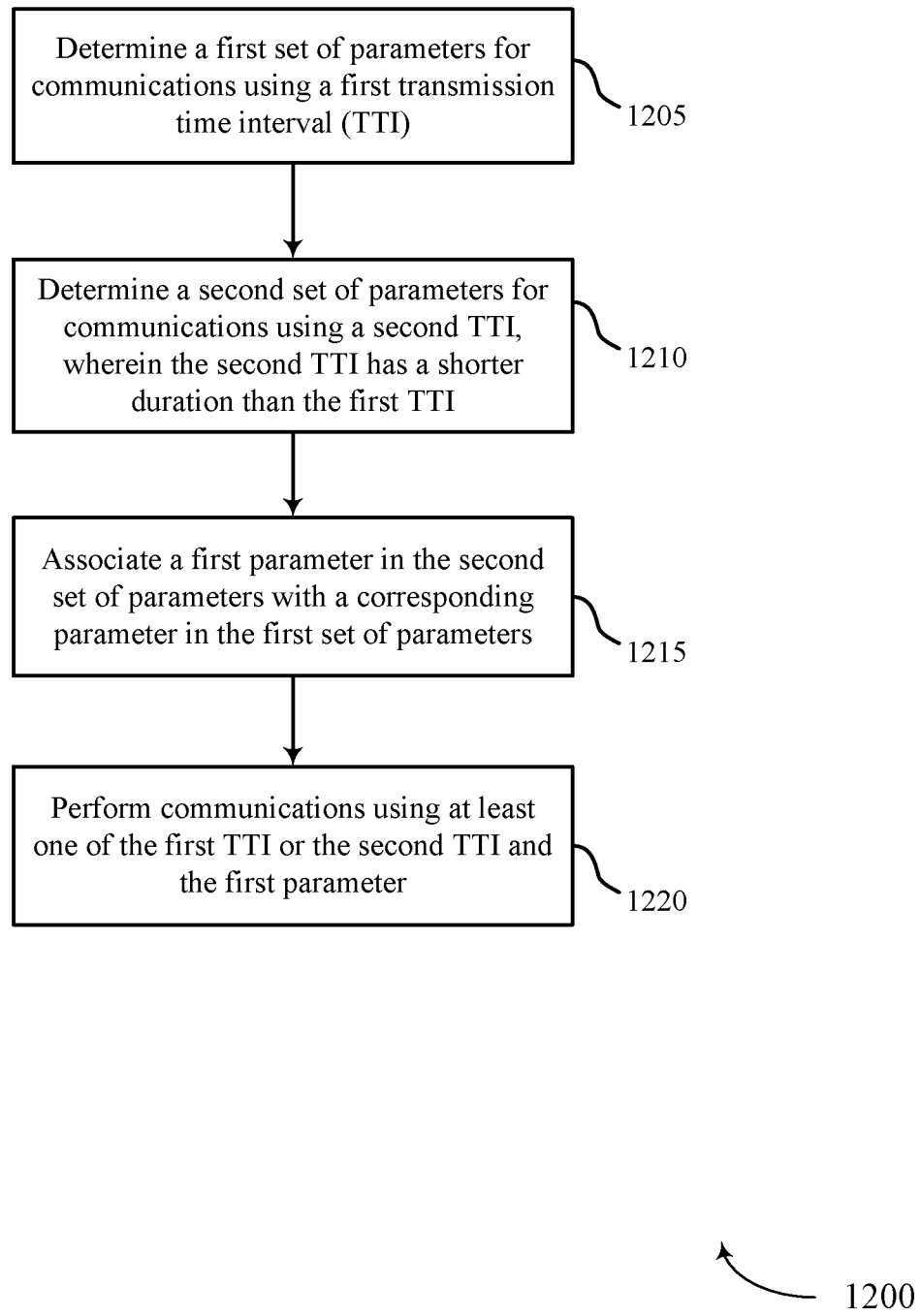
FIG. 12 shows a flowchart illustrating a method for coordinated communications using multiple TTI durations in accordance with various aspects of the present disclosure.

FIG. 12 shows a flowchart illustrating a method 1200 for coordinated communications using multiple TTI durations in accordance with various aspects of the present disclosure. The operations of method 1200 may be implemented by a wireless device, including a UE 115 or its components, a base station 105 or its components, each of which may include wireless device 700 or wireless device 800, as described with reference to FIGS. 1-11. For example, operations of method 1200 may be performed by the TTI parameter module 710 as described with reference to FIGS. 7-9. In some examples, the wireless device may execute a set of codes to control the functional elements to perform the functions described below. Additionally or alternatively, the wireless device may perform aspects the functions described below using special-purpose hardware.

At block 1205, the wireless device may determine a first set of parameters for communications using a first transmission time interval (TTI), as described above with reference to FIGS. 1-11. In certain examples, the operations of block 1205 may be performed by the parameter determination module 810 as described above with reference to FIGS. 8-9, TTI parameter module 1010 of FIG. 10, or base station TTI parameter module 1110 of FIG. 11.

At block 1210, the wireless device may determine a second set of parameters for communications using a second TTI, wherein the second TTI has a shorter duration than the first TTI, as described above with reference to FIGS. 1-11. In certain examples, the operations of block 1210 may be performed by the parameter determination module 810 as described above with reference to FIGS. 8-9, TTI parameter module 1010 of FIG. 10, or base station TTI parameter module 1110 of FIG. 11.

At block 1215, the wireless device may associate a first parameter in the second set of parameters with a corresponding parameter in the first set of parameters, as described above with reference to FIGS. 1-11. In certain examples, the operations of block 1215 may be performed by the transmitter 715 and TTI parameter module 710 of FIGS. 7-9, or may be performed by the parameter association module 815 as described above with reference to FIGS. 8-9, TTI parameter module 1010 of FIG. 10, or base station TTI parameter module 1110 of FIG. 11.

At block 1220, the wireless device may perform communications using at least one of the first TTI or the second TTI and the first parameter, as described above with reference to FIGS. 1-11. In certain examples, the operations of block 1220 may be performed by the receiver 705 or transmitter 715 and TTI parameter module 710 of FIGS. 7-9, TTI parameter module 1010 of FIG. 10 in conjunction with transceiver 1035 and antennas 1140, or base station TTI parameter module 1110 of FIG. 11 in conjunction with transceiver 1135 and antennas 1140.

Figure 13:
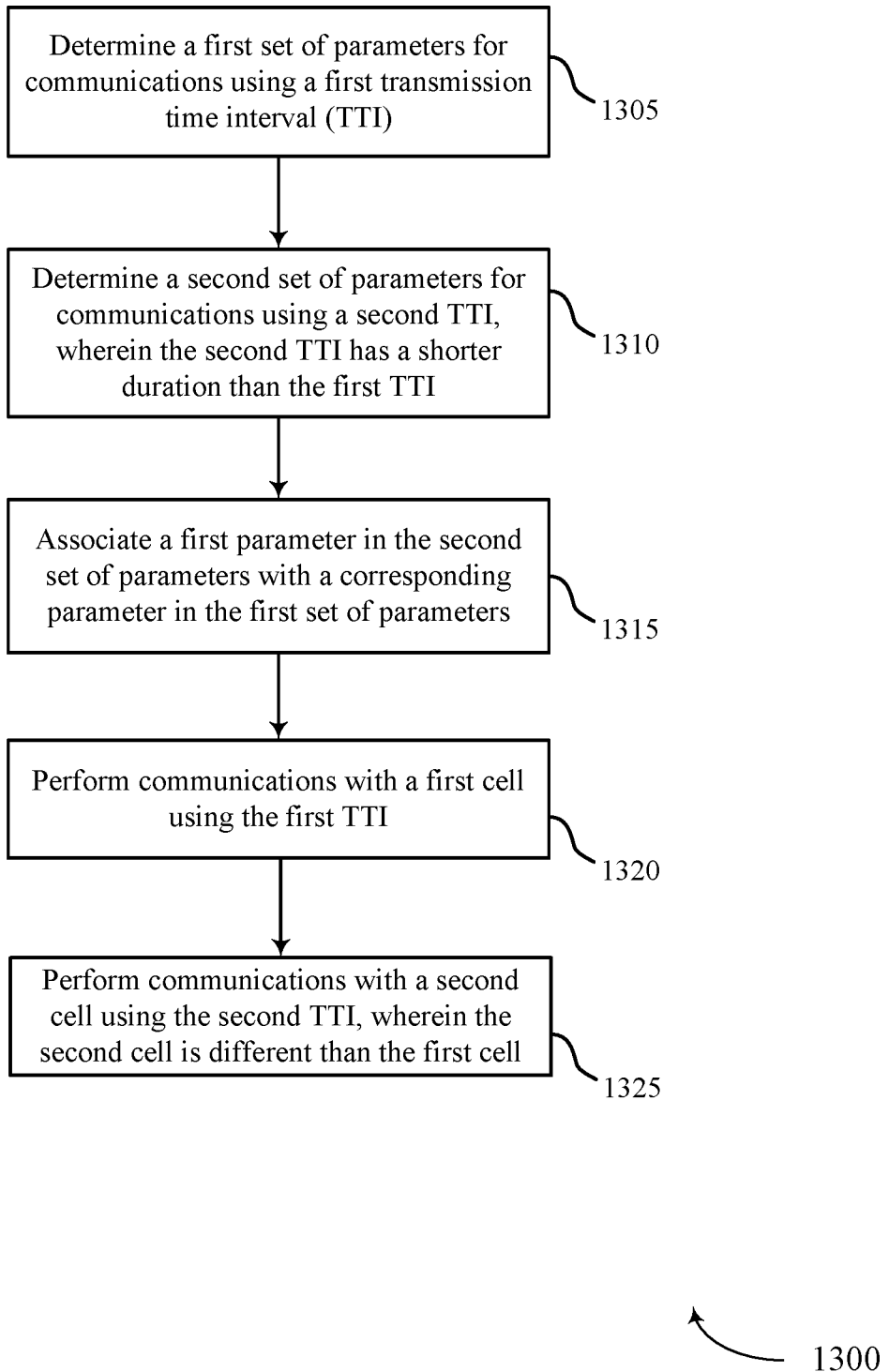
FIG. 13 shows a flowchart illustrating a method for coordinated communications using multiple TTI durations in accordance with various aspects of the present disclosure.

FIG. 13 shows a flowchart illustrating a method 1300 for coordinated communications using multiple TTI durations in accordance with various aspects of the present disclosure. The operations of method 1300 may be implemented by a wireless device, including a UE 115 or its components, a base station 105 or its components, each of which may include wireless device 700 or wireless device 800, as described with reference to FIGS. 1-11. For example, operations of method 1300 may be performed by the TTI parameter module 710 as described with reference to FIGS. 7-9. In some examples, the wireless device may execute a set of codes to control the functional elements to perform the functions described below. Additionally or alternatively, the wireless device may perform aspects the functions described below using special-purpose hardware.

At block 1305, the wireless device may determine a first set of parameters for communications using a first transmission time interval (TTI), as described above with reference to FIGS. 1-11. In certain examples, the operations of block 1305 may be performed by the parameter determination module 810 as described above with reference to FIGS. 8-9, TTI parameter module 1010 of FIG. 10, or base station TTI parameter module 1110 of FIG. 11.

At block 1310, the wireless device may determine a second set of parameters for communications using a second TTI, wherein the second TTI has a shorter duration than the first TTI, as described above with reference to FIGS. 1-11. In certain examples, the operations of block 1310 may be performed by the parameter determination module 810 as described above with reference to FIGS. 8-9, TTI parameter module 1010 of FIG. 10, or base station TTI parameter module 1110 of FIG. 11.

At block 1315, the wireless device may associate a first parameter in the second set of parameters with a corresponding parameter in the first set of parameters, as described above with reference to FIGS. 1-11. In certain examples, the operations of block 1315 may be performed by the transmitter 715 and parameter determination module 810 of FIGS. 8-10, or may be performed by the parameter association module 815 as described above with reference to FIGS. 8-9, TTI parameter module 1010 of FIG. 10, or base station TTI parameter module 1110 of FIG. 11.

At block 1320, the wireless device may perform communications with a first cell using the first TTI, as described above with reference to FIGS. 1-11. In certain examples, the operations of block 1320 may be performed by the receiver 705 or transmitter 715 and TTI parameter module 710 of FIGS. 7-9, TTI parameter module 1010 of FIG. 10 in conjunction with transceiver 1035 and antennas 1140, or base station TTI parameter module 1110 of FIG. 11 in conjunction with transceiver 1135 and antennas 1140.

At block 1325, the wireless device may perform communications with a second cell using the second TTI, wherein the second cell is different than the first cell, as described above with reference to FIGS. 1-11. In certain examples, the operations of block 1325 may be performed by the receiver 705 or transmitter 715 and TTI parameter module 710 of FIGS. 7-9, TTI parameter module 1010 of FIG. 10 in conjunction with transceiver 1035 and antennas 1140, or base station TTI parameter module 1110 of FIG. 11 in conjunction with transceiver 1135 and antennas 1140.

Figure 14:
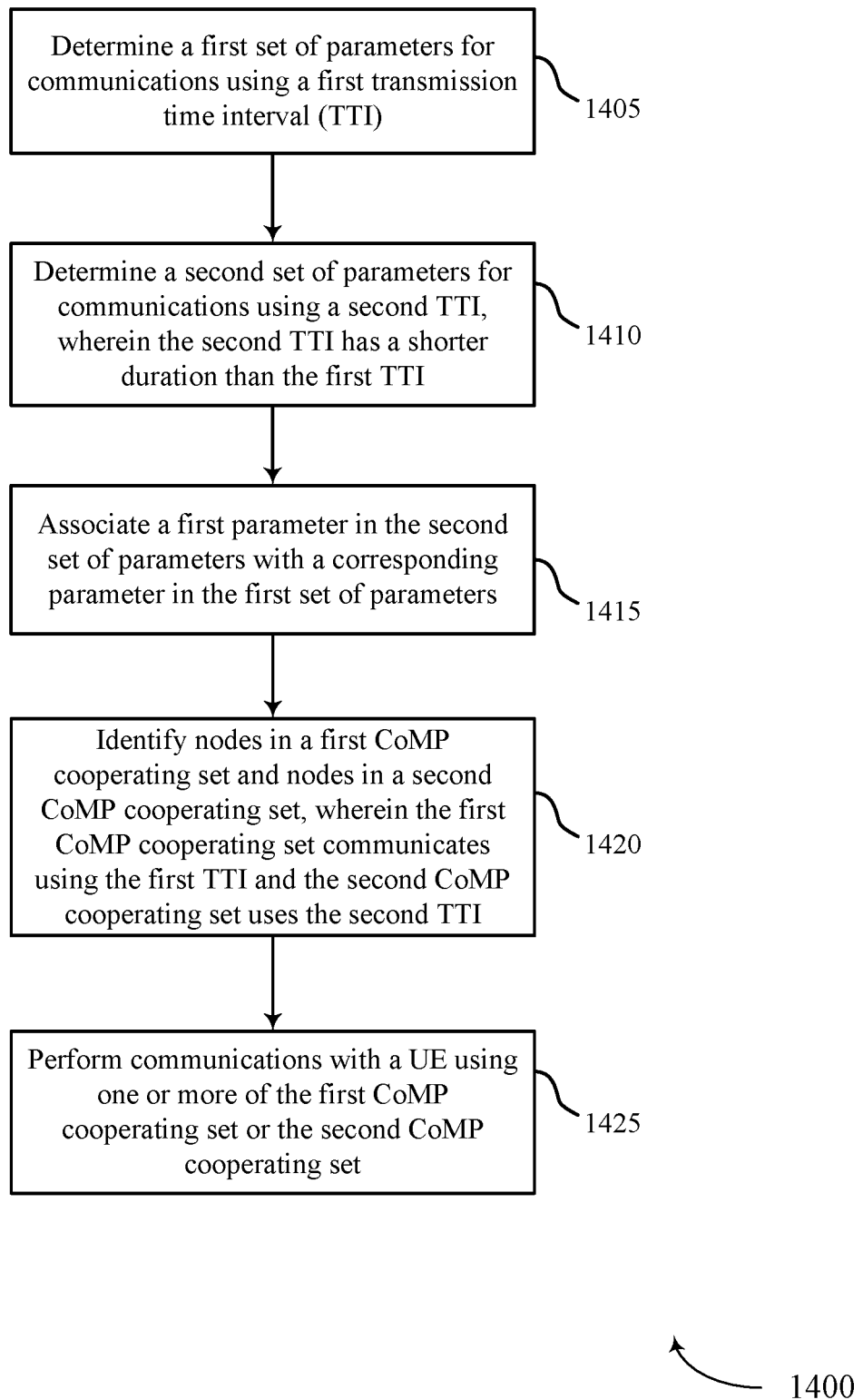
FIG. 14 shows a flowchart illustrating a method for coordinated communications using multiple TTI durations in accordance with various aspects of the present disclosure.

FIG. 14 shows a flowchart illustrating a method 1400 for coordinated communications using multiple TTI durations in accordance with various aspects of the present disclosure. The operations of method 1400 may be implemented by a wireless device, including a base station 105 or its components, each of which may include wireless device 700 or wireless device 800, as described with reference to FIGS. 1-11. For example, operations of method 1400 may be performed by the TTI parameter module 710 as described with reference to FIGS. 7-9. In some examples, the wireless device may execute a set of codes to control the functional elements to perform the functions described below. Additionally or alternatively, the wireless device may perform aspects the functions described below using special-purpose hardware.

At block 1405, the wireless device may determine a first set of parameters for communications using a first transmission time interval (TTI), as described above with reference to FIGS. 1-11. In certain examples, the operations of block 1405 may be performed by the parameter determination module 810 as described above with reference to FIGS. 8-9, or base station TTI parameter module 1110 of FIG. 11.

At block 1410, the wireless device may determine a second set of parameters for communications using a second TTI, wherein the second TTI has a shorter duration than the first TTI, as described above with reference to FIGS. 1-11. In certain examples, the operations of block 1410 may be performed by the parameter determination module 810 as described above with reference to FIGS. 8-9, or base station TTI parameter module 1110 of FIG. 11.

At block 1415, the wireless device may associate a first parameter in the second set of parameters with a corresponding parameter in the first set of parameters, as described above with reference to FIGS. 1-11. In certain examples, the operations of block 1415 may be performed by the transmitter 715 and parameter determination module 810 of FIGS. 8-10, or may be performed by the parameter association module 815 as described above with reference to FIGS. 8-9, or base station TTI parameter module 1110 of FIG. 11.

At block 1420, the wireless device may identify nodes in a first CoMP cooperating set and nodes in a second CoMP cooperating set, wherein the first CoMP cooperating set communicates using the first TTI and the second CoMP cooperating set uses the second TTI, as described above with reference to FIGS. 1-11. In certain examples, the operations of block 1420 may be performed by the CoMP transmission scheme module 905 of FIG. 9, or base station TTI parameter module 1110 of FIG. 11.

At block 1425, the wireless device may perform communications with a UE using one or more of the first CoMP cooperating set or the second CoMP cooperating set, as described above with reference to FIGS. 1-11. In certain examples, the operations of block 1425 may be performed by the receiver 705 or transmitter 715 and TTI parameter module 710 of FIGS. 7-9, or base station TTI parameter module 1110 of FIG. 11 in conjunction with transceiver 1135 and antennas 1140.

Figure 15:
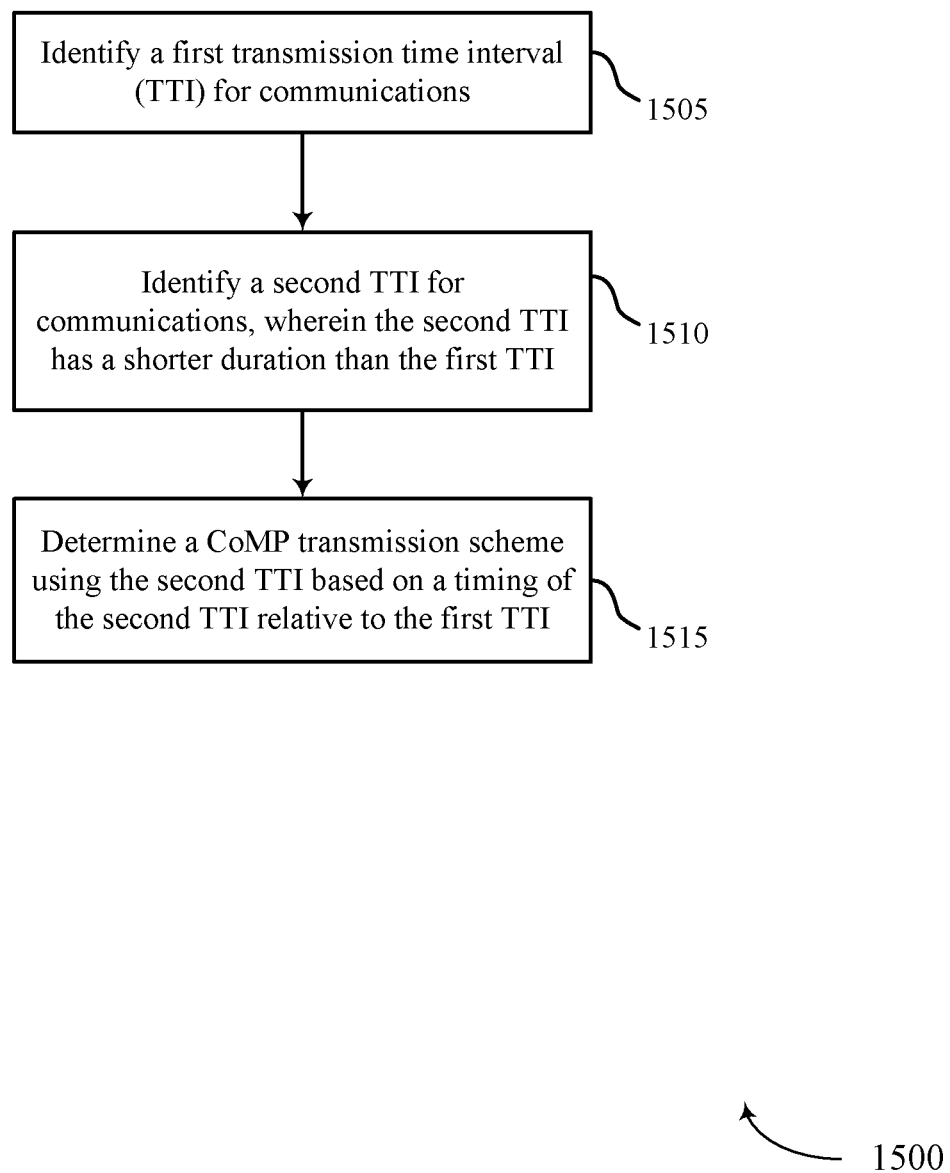
FIG. 15 shows a flowchart illustrating a method for coordinated communications using multiple TTI durations in accordance with various aspects of the present disclosure.

FIG. 15 shows a flowchart illustrating a method 1500 for coordinated communications using multiple TTI durations in accordance with various aspects of the present disclosure. The operations of method 1500 may be implemented by a wireless device, including a UE 115 or its components, a base station 105 or its components, each of which may include wireless device 700 or wireless device 800, as described with reference to FIGS. 1-11. For example, the operations of method 1500 may be performed by the TTI parameter module 710 as described with reference to FIGS. 7-9. In some examples, the wireless device may execute a set of codes to control the functional elements to perform the functions described below. Additionally or alternatively, the wireless device may perform aspects the functions described below using special-purpose hardware.

At block 1505, the wireless device may identify a first transmission time interval (TTI) for communications, as described above with reference to FIGS. 1-11. In certain examples, the operations of block 1505 may be performed by the TTI identification module 805 as described above with reference to FIGS. 8-9, TTI parameter module 1010 of FIG. 10, or base station TTI parameter module 1110 of FIG. 11.

At block 1510, the wireless device may identify a second TTI for communications, wherein the second TTI has a shorter duration than the first TTI, as described above with reference to FIGS. 1-11. In certain examples, the operations of block 1510 may be performed by the TTI identification module 805 as described above with reference to FIGS. 8-9, TTI parameter module 1010 of FIG. 10, or base station TTI parameter module 1110 of FIG. 11.

At block 1515, the wireless device may determine a CoMP transmission scheme using the second TTI based on a timing of the second TTI relative to the first TTI, as described above with reference to FIGS. 1-11. In certain examples, the operations of block 1515 may be performed by the control/data region determination module 940 as described above with reference to FIG. 9, TTI parameter module 1010 of FIG. 10, or base station TTI parameter module 1110 of FIG. 11.

Figure 16:
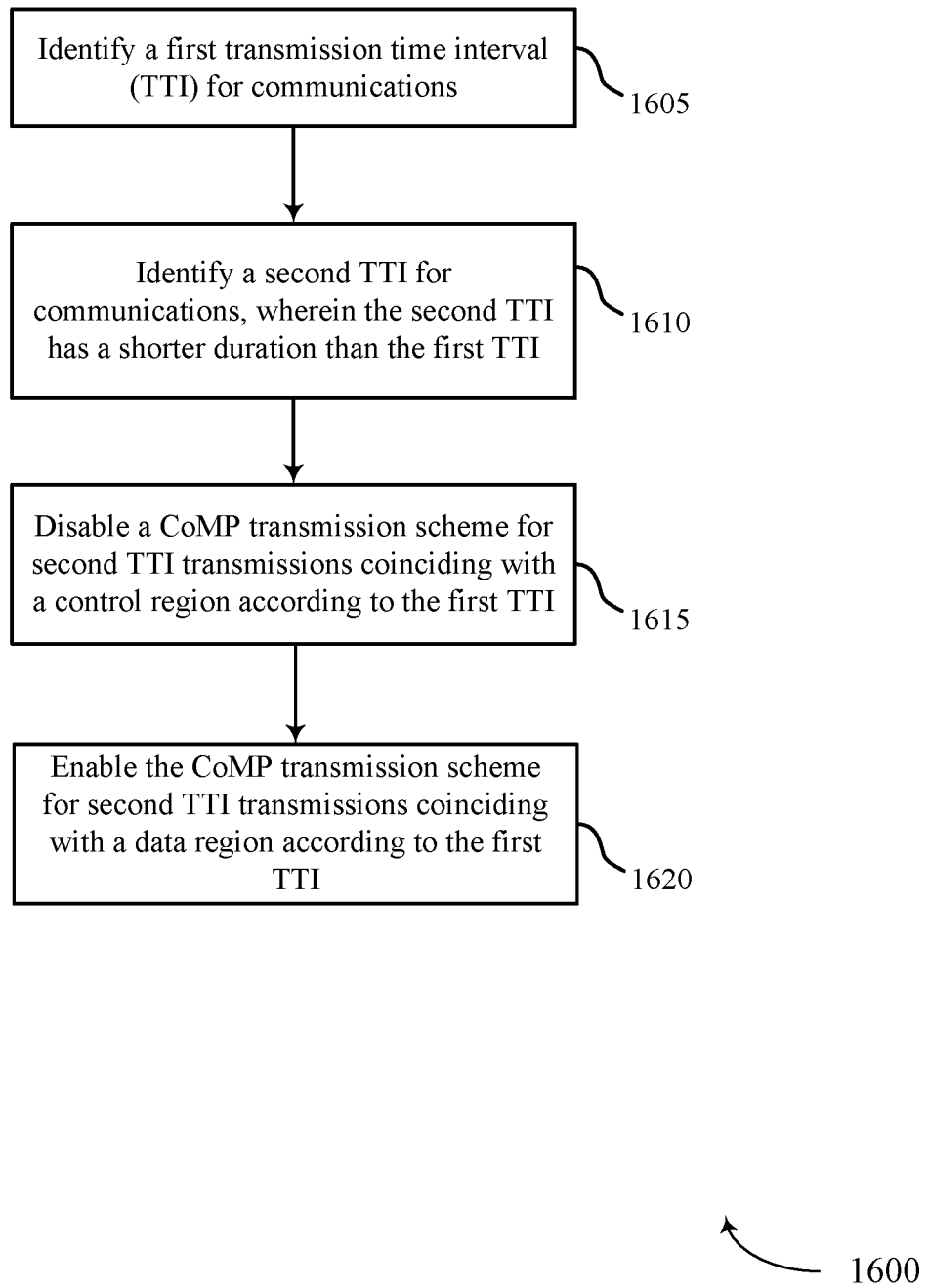
FIG. 16 shows a flowchart illustrating a method for coordinated communications using multiple TTI durations in accordance with various aspects of the present disclosure.

FIG. 16 shows a flowchart illustrating a method 1600 for coordinated communications using multiple TTI durations in accordance with various aspects of the present disclosure. The operations of method 1600 may be implemented by a wireless device, including a UE 115 or its components, a base station 105 or its components, each of which may include wireless device 700 or wireless device 800, as described with reference to FIGS. 1-11. For example, operations of method 1600 may be performed by the TTI parameter module 710 as described with reference to FIGS. 7-9. In some examples, the wireless device may execute a set of codes to control the functional elements to perform the functions described below. Additionally or alternatively, the wireless device may perform aspects the functions described below using special-purpose hardware.

At block 1605, the wireless device may identify a first transmission time interval (TTI) for communications, as described above with reference to FIGS. 1-11. In certain examples, the operations of block 1605 may be performed by the TTI identification module 805 as described above with reference to FIGS. 8-9, TTI parameter module 1010 of FIG. 10, or base station TTI parameter module 1110 of FIG. 11.

At block 1610, the wireless device may identify a second TTI for communications, wherein the second TTI has a shorter duration than the first TTI, as described above with reference to FIGS. 1-11. In certain examples, the operations of block 1610 may be performed by the TTI identification module 805 as described above with reference to FIGS. 8-9, TTI parameter module 1010 of FIG. 10, or base station TTI parameter module 1110 of FIG. 11.

At block 1615, the wireless device may disable a CoMP transmission scheme for second TTI transmissions coinciding with a control region in the first TTI, as described above with reference to FIGS. 1-11. In certain examples, the operations of block 1615 may be performed by the CoMP transmission scheme module 905 as described above with reference to FIG. 9, TTI parameter module 1010 of FIG. 10, or base station TTI parameter module 1110 of FIG. 11.

At block 1620, the wireless device may enable the CoMP transmission scheme for second TTI transmissions coinciding with a data region of the first TTI, as described above with reference to FIGS. 1-11. In certain examples, the operations of block 1620 may be performed by the CoMP transmission scheme module 905 as described above with reference to FIG. 9, TTI parameter module 1010 of FIG. 10, or base station TTI parameter module 1110 of FIG. 11.

Thus, methods 1200, 1300, 1400, 1500, and 1600 may provide for random access in low latency wireless communications. It should be noted that methods 1200, 1300, 1400, 1500, and 1600 describe possible implementation, and that the operations and the steps may be rearranged or otherwise modified such that other implementations are possible. In some examples, aspects from two or more of the methods 1200, 1300, 1400, 1500, and 1600 may be combined.

The detailed description set forth above in connection with the appended drawings describes example configurations and does not represent all the examples that may be implemented or that are within the scope of the claims. The term "exemplary," as may be used herein, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method for wireless communication, comprising:
   determining, in a system that supports communications with a first cell using a first transmission time interval (TTI) duration, the first TTI duration having a first duration of a subframe, and communications with a second cell using a second TTI duration, the second TTI duration having a second duration that is less than or equal to one slot, a first set of parameters for the communications with the first cell using the first TTI duration;

determining a second set of parameters for the communications with the second cell using the second TTI duration, the second set of parameters including a first parameter for a channel state information (CSI) process for the second TTI duration;

identifying an association between the first parameter for the CSI process for the second TTI duration and a corresponding parameter for a corresponding CSI process for the first TTI duration, wherein the corresponding parameter is a parameter in the first set of parameters;

determining a CoMP transmission scheme of a transmission using the second TTI duration based at least in part on a timing of the transmission using the second TTI duration relative to the first TTI duration, wherein the CoMP transmission scheme is disabled when the transmission using the second TTI duration coincides with a control region of the first TTI duration and the CoMP transmission scheme is enabled when the transmission using the second TTI duration coincides with a data region of the first TTI duration; and performing communications using at least one of the first TTI duration or the second TTI duration, the communications based at least in part on the first parameter and the association between the first parameter and the corresponding parameter.

2. The method of claim 1, wherein the first parameter comprises at least one of a time tracking parameter of a node or a frequency tracking parameter of the node, or both.

3. The method of claim 1, wherein the performing communications comprises:
performing at least one of dynamic point selection (DPS) CoMP communications, coordinated beamforming (CBF) CoMP communications, or joint transmission (JT) CoMP communications, or any combination thereof.

4. The method of claim 1, wherein the performing communications comprises:
identifying a first plurality of nodes in a first CoMP cooperating set of nodes, the first CoMP cooperating set of nodes including the first cell, and a second plurality of nodes in a second CoMP cooperating set of nodes, the second CoMP cooperating set of nodes including the second cell, wherein the first CoMP cooperating set of nodes communicates using the first TTI duration and the second CoMP cooperating set of nodes communicates using the second TTI duration; and
performing communications with a user equipment (UE) using one or more of the first CoMP cooperating set of nodes or the second CoMP cooperating set of nodes, and using at least one of the first TTI duration or the second TTI duration and the first parameter.

5. The method of claim 4, wherein the second plurality of nodes in the second CoMP cooperating set of nodes are a subset of the first plurality of nodes in the first CoMP cooperating set of nodes.

6. The method of claim 1, wherein the performing communications comprises performing common reference signal (CRS) based communications or demodulation reference signal (DM-RS) based communications, and wherein the first parameter comprises a CRS-based parameter or a DM-RS-based parameter.

7. The method of claim 1, further comprising:
identifying two or more channel state information (CSI) processes for communications using the first TTI duration or the second TTI duration, the two or more CSI processes comprising the CSI process for the second TTI duration and the corresponding CSI process for the first TTI duration.

8. The method of claim 1, wherein the first parameter comprises at least one of a rank indicator (RI), a precoding matrix indictor (PMI), or a precoding type indicator (PTI), or any combination thereof.

9. The method of claim 1, wherein the first parameter for the CSI process for the second TTI duration comprises a channel quality indicator (CQI) that is derived from a CQI for communications using the first TTI duration.

10. The method of claim 1, wherein the CoMP transmission scheme is based on a common reference signal (CRS) when the transmission using the second TTI duration coincides with a control region of the first TTI duration and the CoMP transmission scheme is based on a demodulation reference signal (DM-RS) when the transmission using the second TTI duration coincides with a data region of the first TTI duration.

11. The method of claim 1, wherein a quantity of orthogonal frequency division multiplexing (OFDM) symbols in a control region in the first TTI duration is variable, and wherein one or more OFDM symbols are blindly decoded to determine if the OFDM symbols comprise control region OFDM symbols or data region OFDM symbols.

12. The method of claim 1, wherein a number of orthogonal frequency division multiplexing (OFDM) symbols of a control region in the first TTI duration is determined based at least in part on a channel format indicator and a type of subframe transmitted using the second TTI duration.

13. The method of claim 1, wherein a subset of orthogonal frequency division multiplexing (OFDM) symbols transmitted using the first TTI duration are configured to be control region symbols in the first TTI duration irrespective of whether each symbol in the subset of OFDM symbols comprises control information or data.

14. The method of claim 1, wherein the CoMP transmission scheme for a control region in the first TTI duration and a number of orthogonal frequency division multiplexing (OFDM) symbols of the control region are signaled to a user equipment (UE).

15. An apparatus for wireless communication, comprising:
means for determining, in a system that supports communications with a first cell using a first transmission time interval (TTI) duration, the first TTI duration having a first duration of a subframe, and communications with a second cell using a second TTI duration, the second TTI duration having a second duration that is less than or equal to one slot, a first set of parameters for the communications with the first cell using the first TTI duration;
means for determining a second set of parameters for the communications with the second cell using the second TTI duration, the second set of parameters including a first parameter for a channel state information (CSI) process for the second TTI duration;
means for identifying an association between the first parameter for the CSI process for the second TTI duration and a corresponding parameter for a corresponding CSI process for the first TTI duration, wherein the corresponding parameter is a parameter in the first set of parameters;

means for determining a CoMP transmission scheme of a transmission using the second TTI duration based at least in part on a timing of the transmission using the second TTI duration relative to the first TTI duration, wherein the CoMP transmission scheme is disabled when the transmission using the second TTI duration coincides with a control region of the first TTI duration and the CoMP transmission scheme is enabled when the transmission using the second TTI duration coincides with a data region of the first TTI duration; and means for performing communications using at least one of the first TTI duration or the second TTI duration, the communications based at least in part on the first parameter and the association between the first parameter and the corresponding parameter.

16. An apparatus for communication, comprising:
a processor;
memory in electronic communication with the processor; and
instructions stored in the memory, wherein the instructions are executable by the processor to cause the apparatus to:
determine, in a system that supports communications with a first cell using a first transmission time interval (TTI) duration, the first TTI duration having a first duration of a subframe, and communications with a second cell using a second TTI duration, the second TTI duration having a second duration that is less than or equal to one slot, a first set of parameters for the communications with the first cell using the first TTI duration;
determine a second set of parameters for the communications with the second cell using the second TTI duration, the second set of parameters including a first parameter for a channel state information (CSI) process for the second TTI duration;
identify an association between the first parameter for the CSI process for the second TTI duration and a corresponding parameter for a corresponding CSI process for the first TTI duration, wherein the corresponding parameter is a parameter in the first set of parameters;
determine a CoMP transmission scheme of a transmission using the second TTI duration based at least in part on a timing of the transmission using the second TTI duration relative to the first TTI duration, wherein the CoMP transmission scheme is disabled when the transmission using the second TTI duration coincides with a control region of the first TTI duration and the CoMP transmission scheme is enabled when the transmission using the second TTI duration coincides with a data region of the first TTI duration; and
perform communications using at least one of the first TTI duration or the second TTI duration, the communications based at least in part on the first parameter and the association between the first parameter and the corresponding parameter.

17. The apparatus of claim 16, wherein the first parameter comprises at least one of a time tracking parameter of a node or a frequency tracking parameter of the node, or both.

18. The apparatus of claim 16, wherein the instructions to perform the communications are executable by the processor to cause the apparatus to:

performing at least one of dynamic point selection (DPS) CoMP communications, coordinated beamforming (CBF) CoMP communications, or joint transmission (JT) CoMP communications, or any combination thereof.

19. The apparatus of claim 16, wherein the instructions to perform the communications are executable by the processor to cause the apparatus to:
identifying a first plurality of nodes in a first CoMP cooperating set of nodes, the first CoMP cooperating set of nodes including the first cell, and a second plurality of nodes in a second CoMP cooperating set of nodes, the second CoMP cooperating set of nodes including the second cell, wherein the first CoMP cooperating set of nodes communicates using the first TTI duration and the second CoMP cooperating set of nodes communicates using the second TTI duration; and
performing communications with a user equipment (UE) using one or more of the first CoMP cooperating set of nodes or the second CoMP cooperating set of nodes, and using at least one of the first TTI duration or the second TTI duration and the first parameter.

20. The apparatus of claim 19, wherein the second plurality of nodes in the second CoMP cooperating set of nodes is a subset of the first plurality of nodes in the first CoMP cooperating set of nodes.

21. The apparatus of claim 16, wherein the instructions to perform the communications are executable by the processor to cause the apparatus to:
perform common reference signal (CRS) based communications or demodulation reference signal (DM-RS) based communications, and wherein the first parameter comprises a CRS-based parameter or a DM-RS-based parameter.

22. The apparatus of claim 16, further comprising instructions executable by the processor to cause the apparatus to:
identify two or more channel state information (CSI) processes for communications using the first TTI duration or the second TTI duration, the two or more CSI processes comprising the CSI process for the second TTI duration and the corresponding CSI process for the first TTI duration.

23. The apparatus of claim 16, wherein the first parameter comprises at least one of a rank indicator (RI), a precoding matrix indictor (PMI), or a precoding type indicator (PTI), or any combination thereof.

24. The apparatus of claim 16, wherein the first parameter for the CSI process for the second TTI duration comprises a channel quality indicator (CQI) that is derived from a CQI for communications using the first TTI duration.

25. The apparatus of claim 16, wherein the CoMP transmission scheme is based on a common reference signal (CRS) when the transmission using the second TTI duration coincides with a control region of the first TTI duration and the CoMP transmission scheme is based on a demodulation reference signal (DM-RS) when the transmission using the second TTI duration coincides with a data region of the first TTI duration.

26. The apparatus of claim 16, wherein a quantity of orthogonal frequency division multiplexing (OFDM) symbols in a control region in the first TTI duration is variable, and wherein one or more OFDM symbols are blindly decoded to determine if the OFDM symbols comprise control region OFDM symbols or data region OFDM symbols.

27. The apparatus of claim 16, wherein a number of orthogonal frequency division multiplexing (OFDM) symbols of a control region in the first TTI duration is determined based at least in part on a channel format indicator and a type of subframe transmitted using the second TTI duration.

28. The apparatus of claim 16, wherein a subset of orthogonal frequency division multiplexing (OFDM) symbols transmitted using the first TTI duration are configured to be control region symbols in the first TTI duration irrespective of whether each symbol in the subset of OFDM symbols comprises control information or data.

29. The apparatus of claim 16, wherein the CoMP transmission scheme for a control region in the first TTI duration and a number of orthogonal frequency division multiplexing (OFDM) symbols of the control region are signaled to a user equipment (UE).

30. A non-transitory computer-readable medium storing code for wireless communication, the code comprising instructions executable to:

determine, in a system that supports communications with a first cell using a first transmission time interval (TTI) duration, the first TTI duration having a first duration of a subframe, and communications with a second cell using a second TTI duration, the second TTI duration having a second duration that is less than or equal to one slot, a first set of parameters for the communications with the first cell using the first TTI duration;

determine a second set of parameters for the communications with the second cell using the second TTI duration, the second set of parameters including a first parameter for a channel state information (CSI) process for the second TTI duration;

identify an association between the first parameter for the CSI process for the second TTI duration and a corresponding parameter for a corresponding CSI process for the first TTI duration, wherein the corresponding parameter is a parameter in the first set of parameters;

determine a CoMP transmission scheme of a transmission using the second TTI duration based at least in part on a timing of the transmission using the second TTI duration relative to the first TTI duration, wherein the CoMP transmission scheme is disabled when the transmission using the second TTI duration coincides with a control region of the first TTI duration and the CoMP transmission scheme is enabled when the transmission using the second TTI duration coincides with a data region of the first TTI duration; and perform communications using at least one of the first TTI duration or the second TTI duration, the communications based at least in part on the first parameter and the association between the first parameter and the corresponding parameter.

* * * * *